United States Patent

[11] 3,626,167

[72] Inventors LeRoy R. Guck
La Verne;
Lawrence G. Hanson, Temple City, both of Calif.; Donald E. Knuth, Princeton, N.J.

[21] Appl. No. 848,263
[22] Filed Aug. 7, 1969
[45] Patented Dec. 7, 1971
[73] Assignee Burroughs Corporation
Detroit, Mich.

[54] SCALING AND NUMBER BASE CONVERTING METHOD AND APPARATUS
35 Claims, 9 Drawing Figs.

[52] U.S. Cl. .......... 235/155, 340/347 DD, 235/169
[51] Int. Cl. .......... H04l 3/00
[50] Field of Search .......... 235/155; 340/347 DD

[56] References Cited

UNITED STATES PATENTS

| | | | |
|---|---|---|---|
| 3,524,976 | 8/1970 | Wang .......... | 235/155 |
| 3,344,261 | 9/1967 | Hornung .......... | 235/155 |
| 3,257,547 | 6/1966 | Bernstein .......... | 235/155 |
| 2,894,686 | 7/1959 | Holmes .......... | 235/155 |

*Primary Examiner*—Maynard R. Wilbur
*Assistant Examiner*—Jeremiah Glassman
*Attorney*—Christie, Parker & Hale

ABSTRACT: Data processing apparatus for shifting a binary signal coded in a first number base by digits coded in a second number base. A first register stores an operator identifying a shift. A second register stores a scale factor signal identifying the number of required digit shifts. Data processing apparatus is responsive to the stored shift operator and the stored scale factor for shifting the binary signal coded in the first number base by the number of digits in the second number base identified by the stored scale factor.

PATENTED DEC 7 1971

3,626,167

SHEET 1 OF 7

INVENTORS.
LEROY R. GUCK
LAWRENCE G. HANSON
DONALD E. KNUTH
BY Christie, Parker & Hale
ATTORNEY

SCALE RIGHT OPERATOR FLOW
PHASE I

SCALE LEFT OPERATOR FLOW

SCALING AND NUMBER BASE CONVERTING METHOD AND APPARATUS

BACKGROUND OF THE INVENTION

1. Field of the Invention

This invention relates to data processing apparatus and more particularly to methods and apparatus for scaling binary coded octal signals by decimal digits. This invention also relates to methods and apparatus for converting signals coded in one number base to signals coded in another number base.

2. Description of the Prior Art

Data processors are commonly used in applications where the data to be processed and the final processed data is binary coded in the decimal number base. However, data processors normally process data represented in binary coded octal form. Therefore, it is necessary to convert numbers between binary coded octal and binary coded decimal signal representation. Additionally, in certain applications, for example in a bank, it is imperative that the processed data be accurate when finally represented in decimal. For example, banks require that their figures be accurate to the nearest cent. Thus, a bank will not tolerate figures that are off, even a few cents, at the end of a day's processing.

A problem arises in maintaining this high degree of accuracy when handling fractional numbers. This is due to the fact that a decimal fraction cannot always be represented exactly in binary code. Accordingly, data processors are normally arranged to handle all numbers as binary coded integers. No mechanism is normally provided to handle fractions.

Many times it is necessary to scale a binary coded octal number to the left by one or more decimal digits in order to convert the number from a fraction to an integer. For example, it may be necessary to add the decimal numbers 12 and 1.2 where the two numbers are actually both represented in binary coded octal form as 12. The number that represents 12 must be scaled or shifted left so that it becomes represented as 120 in order to give the correct relative position to the digits. The numbers may then be added together by the processor arithmetic unit. The decimal point is kept track of by programming.

However, the multiplication by decimal 10 is not merely a matter of shifting the numbers to the left because the numbers 12 and 1.2 are actually represented in binary coded octal integer signals in the processor. Thus, the octal signal equivalents of decimal 12 must be multiplied by octal 12 (decimal 10) to cause the decimal scale left to take place.

Previously, the aforementioned scale left has been handled by programming. The programming method is slow and requires considerable programming space and for this reason is undesirable.

It is also necessary to scale a number represented by coded signals to the right. During a scale right, it is sometimes necessary to convert a binary coded octal number to binary coded decimal. Also, during a scale right, it is sometimes necessary to convert only the low order end of the signals to binary coded decimal and leave the high order end in octal coded form. It is also sometimes necessary to round off a binary coded octal number in decimal during a scale right. For example, the decimal number 25673 may need rounding off at the third digit from the right, i.e. at the digit 6. However, the number is contained in the machine in binary coded octal form. To round off the number at the third digit, it is necessary to convert the low order end of the binary coded octal number to two binary coded decimal digits and then add one unit to the rest of the number if the second digit is 5 or greater. Thus, the number 25673 (which is actually represented in binary coded octal form) is shifted right and converted so that the digits 256 are represented in binary coded octal and the digits 73 are represented in binary coded decimal. Since the 7 is greater than 5, a 1 is added to 256 (represented in binary coded octal) to round it off.

Thus, it is desirable to have a facility to convert the low order portion of a binary coded octal number to decimal or to convert the whole number to octal. This facility has been provided in the past in data processors by programming in which the number to be converted is divided by decimal 10 raised to a power and the remainder saved as a decimal digit. Programming supplemented by large tables or large logical networks have also been used. However, the program and table approaches are slow and require a large amount of programming space. The large logical network is expensive.

SUMMARY OF THE INVENTION

The present invention is directed to a novel method of operating a data processing apparatus and novel apparatus which largely eliminates the aforementioned disadvantages. Many of the parts required in the apparatus are existing equipment in most data processing apparatus.

Broadly, one aspect of the present invention contemplates the shifting or scaling left or right of a binary coded octal number by decimal digit responsive to a single scale or shift operator and a scale factor which identifies the number of decimal digit shifts required. Briefly, such an embodiment of the invention comprises data processing apparatus for shifting a binary signal coded in a first number base by digits coded in a second number base. A first register stores an operator identifying a shift. A second register stores a scale factor signal identifying the number of required digit shifts. Means is provided for providing a binary signal coded in said first number base to be shifted. Means is responsive to the stored shift operator and the stored scale factor for shifting the binary signal coded in the first number base by the number of digits in the second number base identified by the stored scale factor. In a preferred embodiment the first number base is octal and the second is decimal. As a result of this aspect of the present invention, shifting binary coded octal signals decimally is accomplished much more rapidly and wasted programming space is eliminated.

In accordance with a specific embodiment of the present invention, a method is provided for scaling right a binary coded octal signal. Briefly, the method converts a binary coded octal integer signal into a most significant portion coded in octal and a least significant portion composed of binary coded decimal digits. The number of decimal digits are indicated by a scale factor signal. The steps are counting a counter through a predetermined series of states and responding to each of the states for producing a series of binary coded octal digit signals representative of octal $12^{-n}$ where $n$ is at least as large as the maximum number of decimal digits desired in the result. The integer signal and each coded digit signal produced are combined and a fractional signal is generated representative of the product of the series of coded digit signals and the integer signal. The fractional signal, and a series of product signals derived therefrom, are applied to a multiplying means multiplying each by 10 to produce product signals, the fraction signals and a total of at least $n-1$ product signals derived therefrom are applied to multiplying means. The most significant signal, which represents a decimal digit, from each of the product signals in the order formed, most significant to least significant, are stored. The stored decimal digit signals are serially applied, most significant to least significant, to an input of a two-input parallel adder which performs binary addition in octal coded form. The number of decimal digit signals applied is at least $n$ minus the value of the scale factor signal. The adder output signals are applied back to both inputs of the adder, shifted in binary significance with respect to at least one such input, such that the effective sum formed by the adder is the product of ten times the applied adder output signals plus the applied digit signal causing corresponding adder output signals. One of the digit signals is applied to the adder at a time simultaneously with the applying of each different one of the adder output signals. The adder output signals after all such digit signals are applied represent the most significant octal portion of the converted signal and the remaining stored decimal digit signals represent the least significant portion of the converted signal. Apparatus is also contemplated for converting in accordance with the foregoing method which embodies the present invention.

One embodiment of the present invention utilizes the combination of a counter and a decoder to generate a series of digit signals representing a fraction for use in converting an integer signal to a fraction signal. Briefly, such embodiment comprises a data processing apparatus for converting an integer signal to a fraction signal in a predetermined number base. Means is provided for receiving an integer signal to be converted. A counter counts through a sequence of states at least equal in number to the minimum number of significant digit signals, in such number base, desired in the fraction signals. Means, which may be a decoder, is responsive to each state of counter for providing a series of coded digit signals. The series of coded digit signals thus provided represent a fractional number used for converting the integer signal to a fraction signal. Means is provided for combining the series of digit signals and the integer signal for producing fraction signals corresponding to the product thereof.

A method for converting an integer signal utilizing the foregoing apparatus is also contemplated within the broad scope of the present invention. Such an arrangement is of special significance as it eliminates the need for a large register to hold all of the coded digit signals representing the fractional signal used for converting.

According to another aspect of the present invention data processing apparatus is provided for converting signals coded in a first number base to signals coded in a second number base utilizing an adder. Briefly, such an embodiment of the present invention contemplates data processing apparatus for converting a series of binary digital signals coded a first number base to binary signals coded in a second number base. At least a two-input parallel adder is provided which performs binary addition in the second number base. Means is provided for applying the adder output signals back to both inputs of such adder, shifted in binary significance with respect to at least one such input such that the effective sum formed by the adder is the product of the first number base times the applied adder output signals. Means is provided for serially applying such digit signals, from most to least significant digit, to an input of such adder, causing addition thereof into the effective sum being formed and causing corresponding adder output signals, such digit signal applying means being operative for applying one such digit signal substantially simultaneously with the applying of each different one of said adder output signals. The adder output signals after all such digit signals are added correspond to the desired binary signals coded in the second number base.

The present invention also contemplates a method for converting signals coded in a first number base to signals coded in a second number base utilizing the two-input adder. Method and apparatus in accordance with this aspect of the present invention permits the use of adders and registers which already exist in an arithmetic section of a data processor greatly simplifying and speeding up the speed of conversion as it has been accomplished in the prior art.

BRIEF DESCRIPTION OF THE DRAWINGS

FIGS. 4 and 5A–5C show the sequence of operation for execution of a scale right operator.

DESCRIPTION OF THE PREFERRED EMBODIMENT

Terminology

Figures 1, 1A:
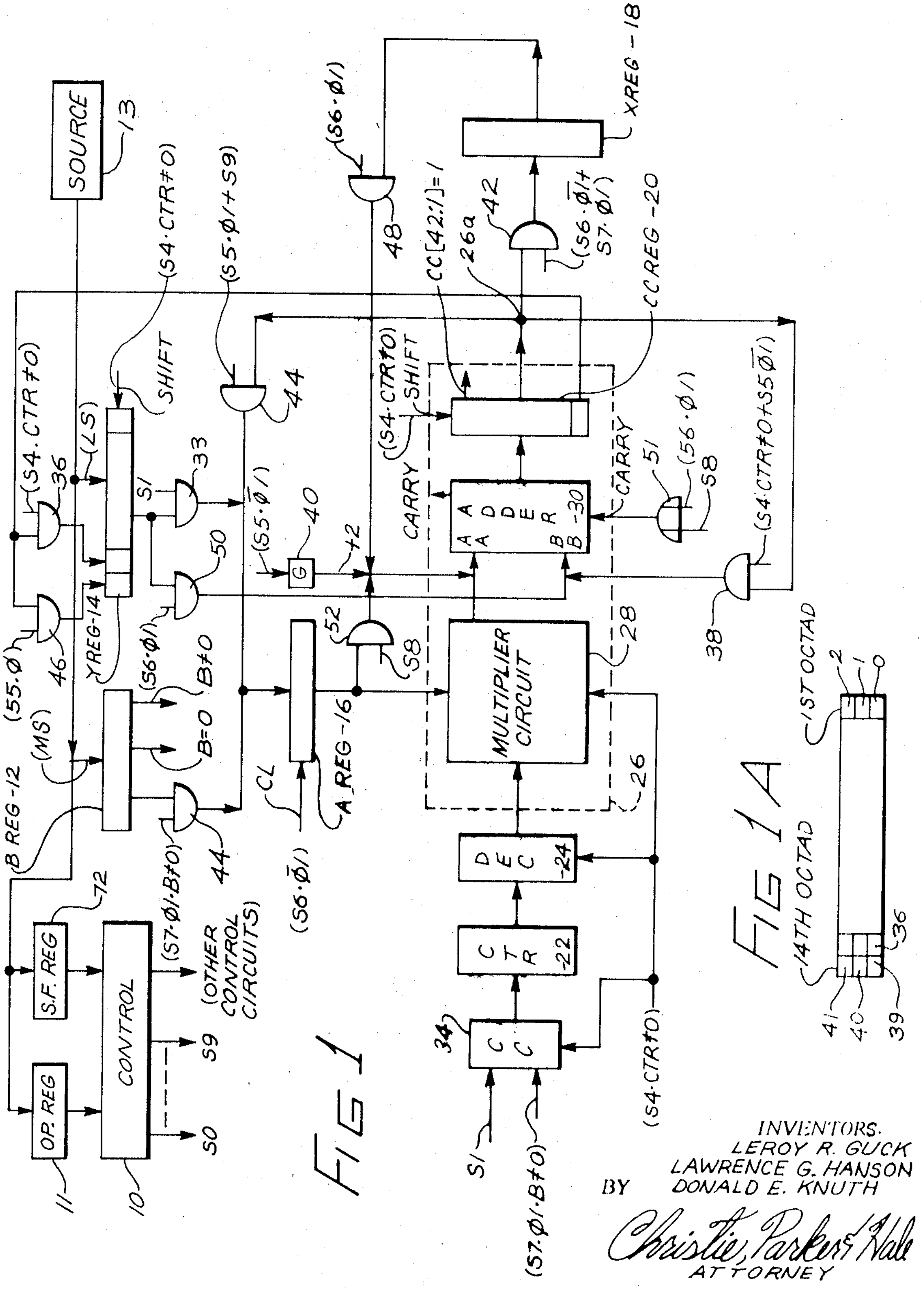
FIG. 1 is a schematic and block diagram of a data processing apparatus for converting a coded integer signal to a coded fraction signal and embodies the present invention.
FIG. 1A is a sketch illustrating the organization of the flip-flops in the registers shown in FIGS. 1 and 3.

Certain terminology has been adopted and simplified notation has been used to describe the invention in order to simplify and clarify the description and drawings. FIGS. 1 and 3 are actually a single system but have been shown separately in order to clarify the different phases of operation of the system. Certain parts are shown in FIG. 1 and are shown again in FIG. 3 for clarity of explanation. The same reference numerals are used in both FIGS. 1 and 3 to identify these same parts. Actually there is only one of each part which is duplicated from FIG. 1 to FIG. 3. For example, a control unit 10 is shown in FIG. 1 and again in FIG. 3.

Output circuits SO–S17 are shown in FIGS. 1 and 3 from the control unit 10. Only S0 and S9 are shown in FIG. 1 and S10 and S17 are shown in FIG. 3, the rest being indicated by dashed lines. The sequence with which the control signals are applied at these output circuits is illustrated by the flow diagrams of FIGS. 4–6. The reference characters for the output circuits are shown adjacent the various flow boxes in FIGS. 4–6. The sequence of operation of the control unit 18 will become evident from the following description and with reference to FIGS. 4–6.

The control unit 10 has additional output circuits which control various operations in the system of FIG. 1. These output circuits are not specifically identified coming out of 10 but are indicated, generally, by "other control circuits". These "other control circuits" are the outputs of conventional logical gating circuits which are contained in the control unit 10 but are not specifically shown in FIGS. 1, 3. These output circuits are shown in brackets ( ) at various inputs in FIGS. 1 and 3 and are expressed in Boolean terms corresponding to the combination of logical signals required to initiate a signal at the corresponding output circuit. The output circuits at which a control signal must be applied to make the Boolean equations true are used in the equations. A "·" is used to indicate an "AND" function whereas a "+" is used to indicate an "OR" function. Thus, $(S4 \cdot CTR \neq 0 + S5 \cdot \overline{\varnothing 1})$ identifies an output circuit from the control unit 10 and indicates that a control signal is applied at output circuit $(S4 \cdot CTR \neq 0 + S5 \cdot \varnothing 1)$ when control signals are applied simultaneously at each of the output circuits S4 and CTR ≠ 0 or S5 and ∅1.

Figure 2:
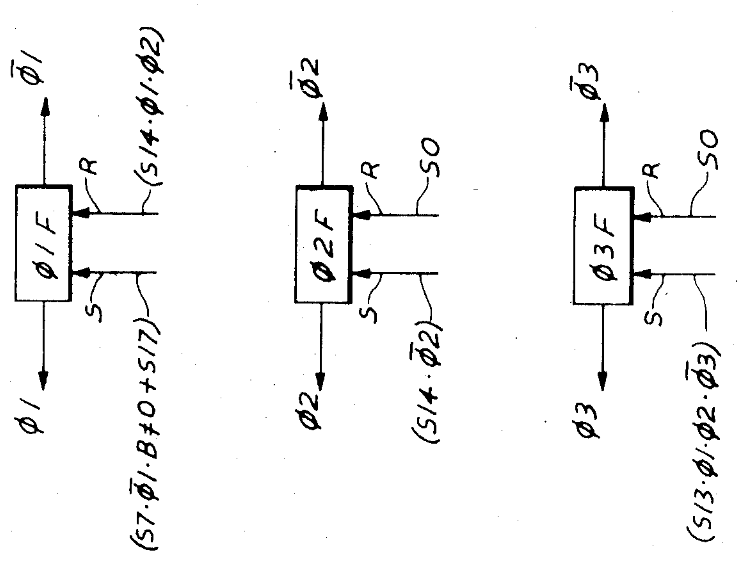
FIG. 2 is a block diagram showing timing and control flip-flops used in the data processing apparatus of FIGS. 1 and 3.
Figure 3:
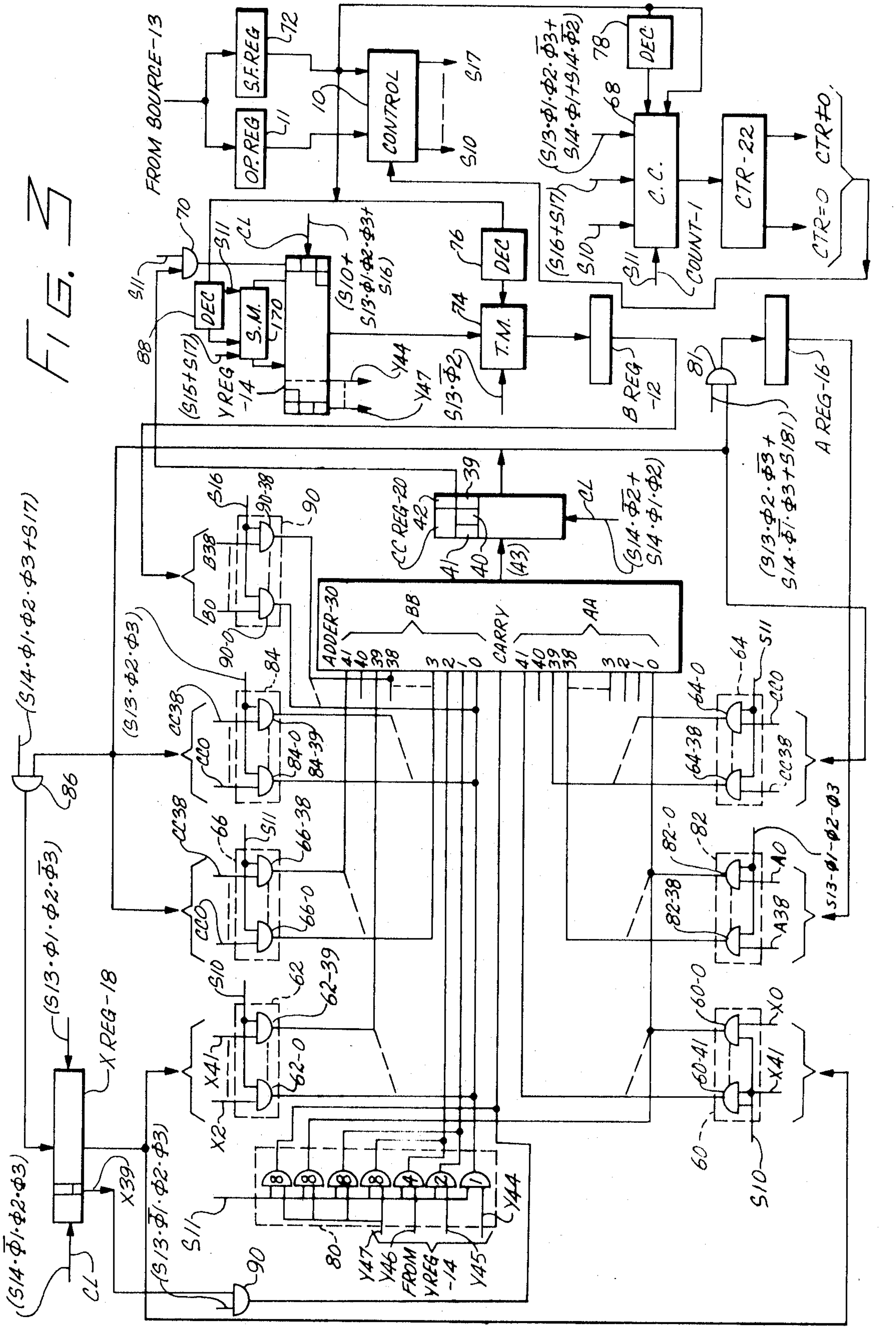
FIG. 3 is a schematic and block diagram of data processing apparatus used for converting coded fraction signals to coded decimal signals and for conversion of coded decimal signals to coded octal signals. The circuits of FIGS. 1 and 3 actually form one system but are broken apart as shown in FIGS. 1 and 3 to simplify the showing and explanation. There are circuits in FIG. 3 which are the same as the circuits shown in FIG. 1. These circuits are identified by common reference numerals.

Flip-flop circuits are used in registers of FIGS. 1 and 3 and are used as timing and control circuits in FIG. 2. The system of notation used to identify the flip-flops and their output circuits should be noted. A flip-flop is identified by a letter, or a letter and a symbol, followed by an "F", i.e. ∅1F, whereas its output circuits are identified by the same symbols with the F removed. A primed symbol, i.e. $\overline{\varnothing 1}$ is used to identify the output circuit receiving a control signal when the corresponding flip-flop, i.e. ∅1F is in a 0 state or storing a "0" bit. An unprimed symbol, i.e. ∅1, is used to identify the output circuit receiving a control signal when the corresponding flip-flop, i.e. ∅1F, is in a 1 state or storing a "1" bit.

The flip-flops making up the cells in each register are identified by similar symbols. The letter designation for a register followed by the number of a cell is used to identify each flip-flop in a register. Thus, the Y register has flip-flops Y0F to Y41F and corresponding output circuits Y0, $\overline{\text{Y0}}$ to Y41, $\overline{\text{Y41}}$, respectively.

Figure 5C:
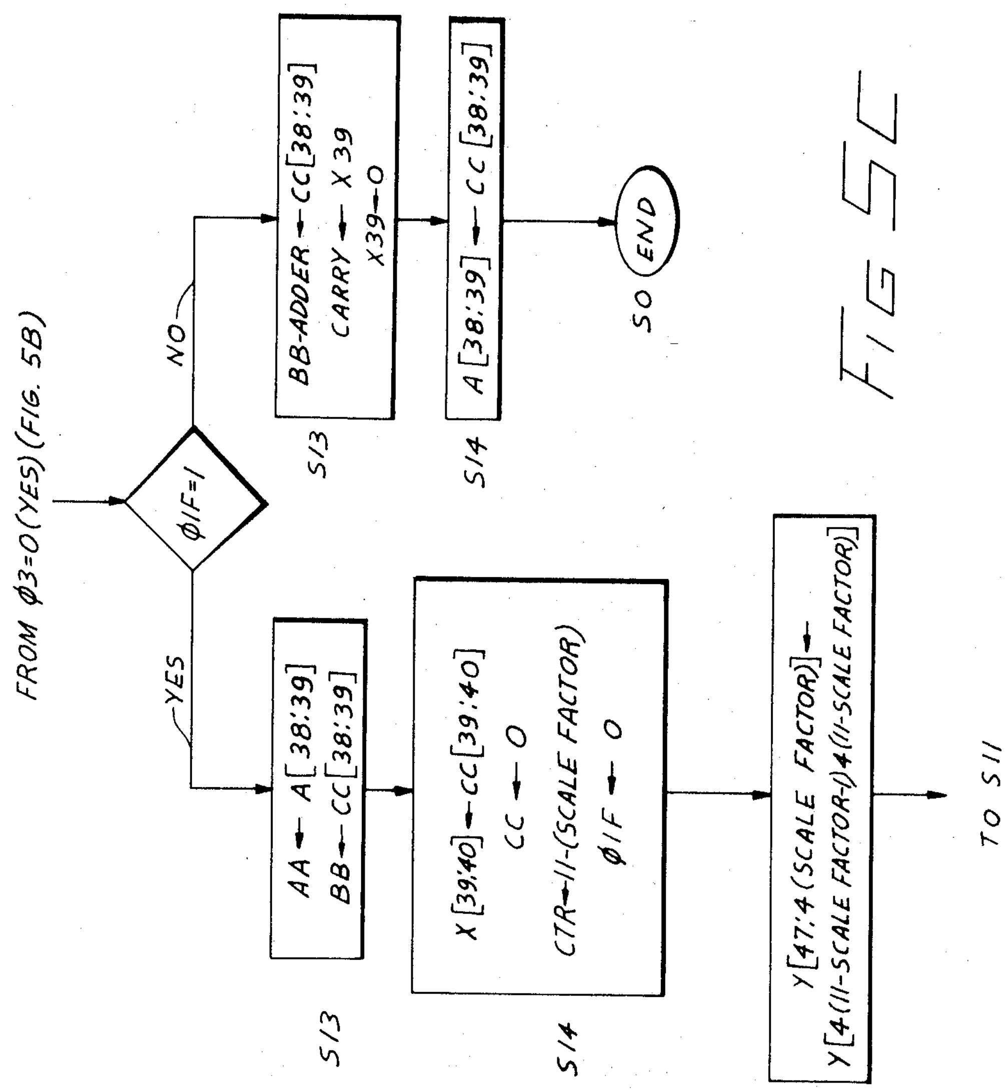
FIGS. 5A–5C form a flow diagram showing the sequence of operation of the data processing apparatus of FIG. 3 for converting a fractional signal to a decimal integer signal and for converting a decimal integer signal to a coded octal signal.
Figure 4:
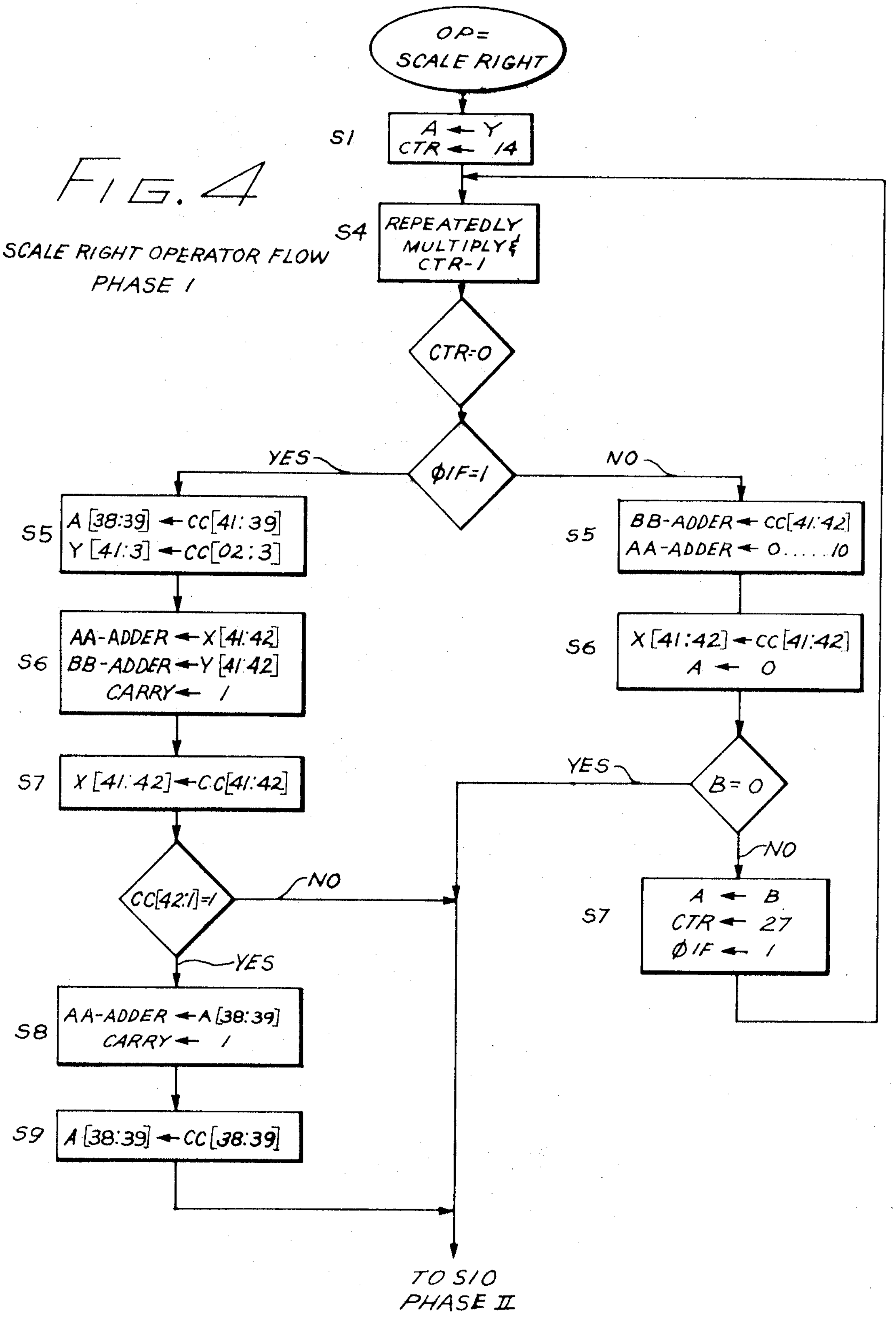
FIG. 4 is a flow diagram showing the sequence of operation of the data processing apparatus of FIG. 1 for converting a coded integer signal to a coded fraction signal.
Figure 5A:
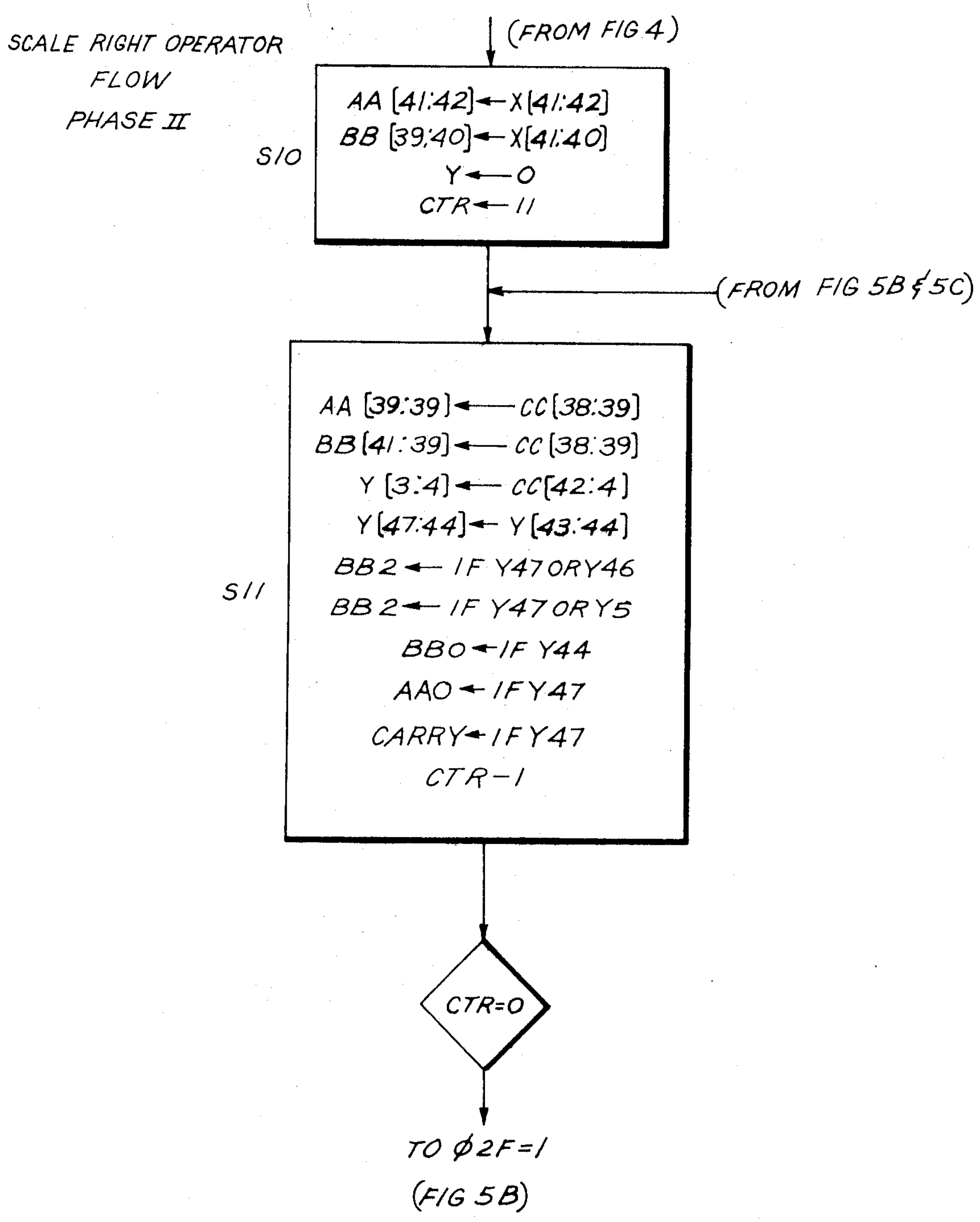
Figure 5B:
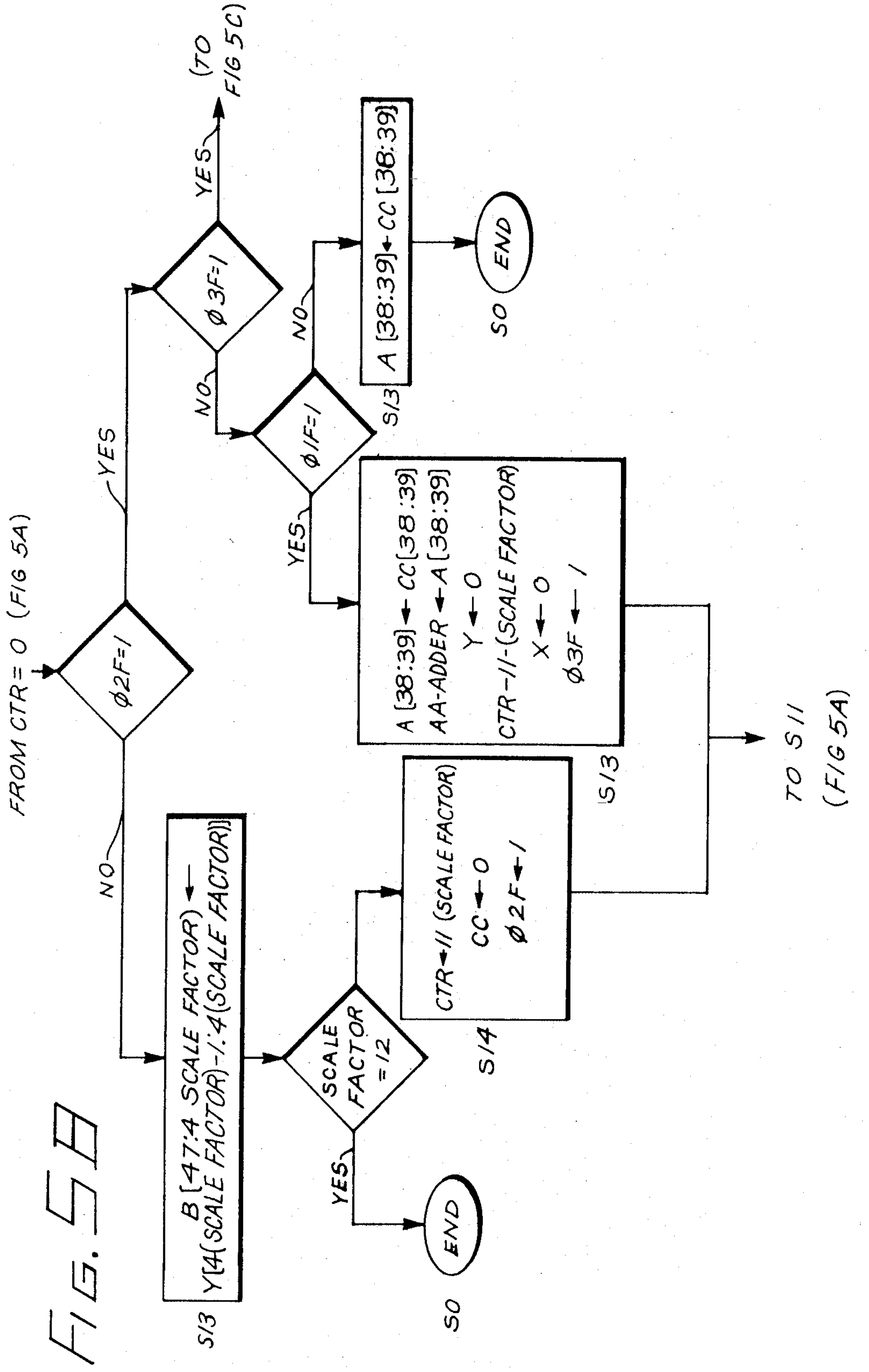
Figure 6:
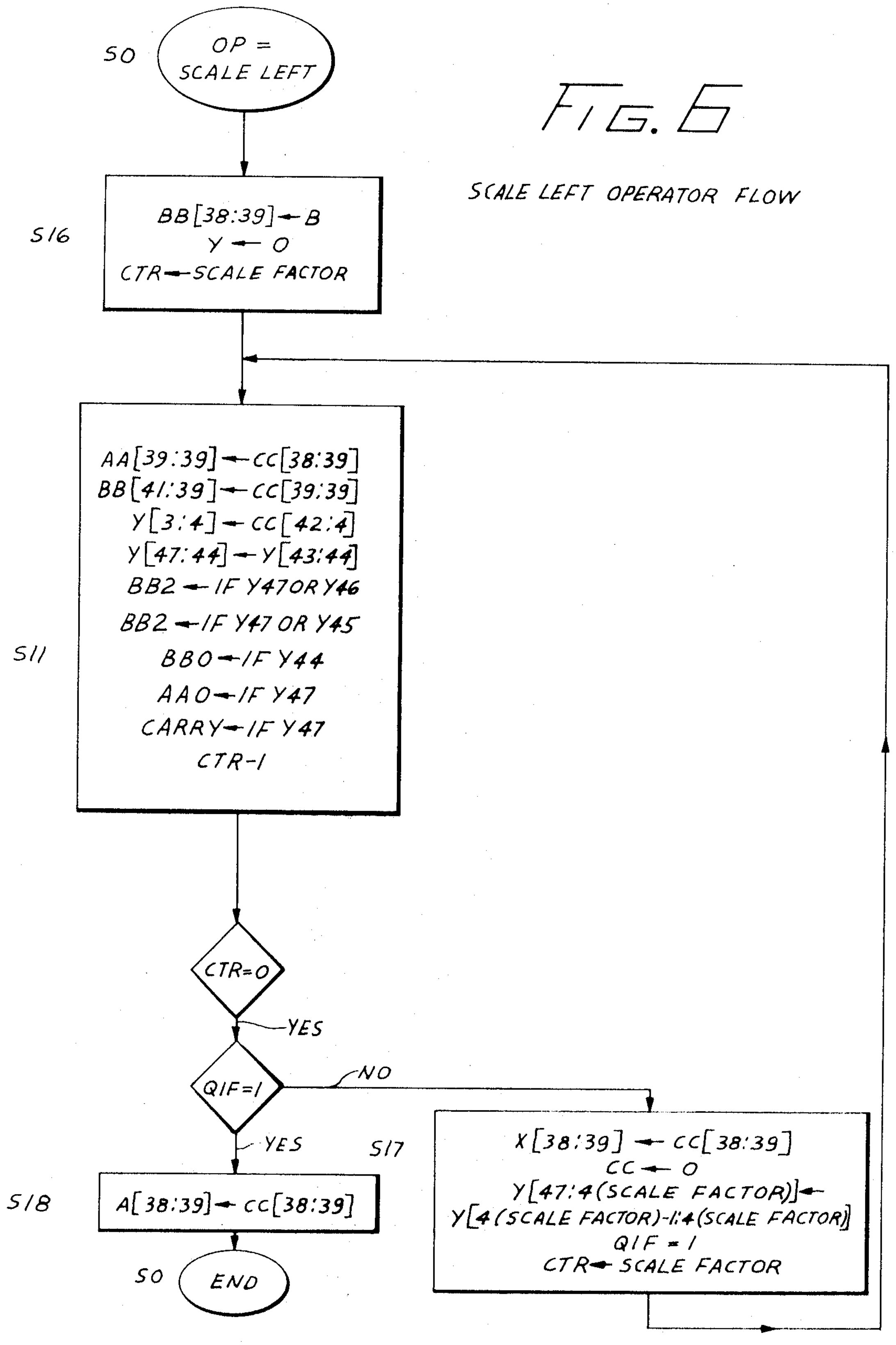
FIG. 6 is a flow diagram showing the sequence of operation of the data processing apparatus of FIG. 3 for execution of a scale left operator.

The flow charts of FIGS. 4–6 use symbols to represent various actions. By way of example, the symbol ← is used to indicate a set or store action and in the notation A ← 0 (FIG. 4) means set the A register to 0 and in the notation A ← Y (FIG. 4) means transfer the content of the Y register to the A register. CTR–1 (FIG. 4) means count the counter down one state.

A group of flip-flops in a register are identified by the symbol for a register; followed by a number corresponding to the highest numbered flip-flop in the group; followed by a colon; followed by the number of flip-flops in the group. For example, A [38:39] ← CC[41:39] (FIG. 4) means that the content of the 39 flip-flops starting with flip-flop 41 in the CC register are to be transferred to the 39 flip-flops starting with flip-flop 38 in the A register.

The flow charts contain boxes which appear to be standing on one corner. These boxes indicate that the condition in the box is checked before going on. For example, the box with 01F=1 in FIG. 4 indicates that if the condition 01F flip-flop is in a "1" state, the path to the left is to be taken, whereas if 01F is not in a "1" state, the path to the right is to be taken.

I. SCALE RIGHT OPERATOR

A. Theory

A "scale right operator" has a "scale factor" associated therewith. The "scale right operator" specifies that a binary coded octal integer signal is to be taken and shifted or scaled right the number of times specified by the associated "scale factor". The "scale factor" and hence the scaling is in terms of decimal digits. Also, the signals after scaling are to contain a binary coded octal integer part and a binary coded decimal integer part. The binary coded decimal part is at the least significant end of the signals and has the number of decimal digits specified by the "scale factor". Thus, a binary coded octal integer signal is shifted in terms of binary coded decimal digits and a portion of the signal is converted to binary coded decimal signals.

The binary coded integer signals may be single precision having only one word or double precision having two words.

The scale right operator is executed by the apparatus herein in two phases, phase I and phase II. During phase I a single precision binary coded octal integer signal is converted to octal a binary coded fraction. To simplify the hardware involved, the whole single precision octal integer is converted to an octal fraction rather than the exact number required by the scale factor. In the case of a double precision integer signal, a portion is converted to a fraction.

During phase II, the single precision octal fraction signal is converted to binary coded decimal signals in integer form. Also, during phase II the most significant decimal digits, which must be in octal form, are converted back to binary coded octal. Similar techniques are applied to the least significant half of a double precision number. The net result of phase I and II is that the binary coded octal integer is shifted to the right a preselected number of digit places where the digit places are decimal digits. The resultant binary coded octal number is the part to the left of the decimal point after the shift.

Consider a simplified example involving a scale factor of 1 and the decimal number 123. The example does not include the actual number of digits used in the disclosed embodiment of the invention but illustrates the sequence of operation required for conversion. During phase I, 123 is converted to a fraction by multiplication using a number raised to a negative power. Multiplication is used rather than division because multiplication is used rather than division because multiplication is much more rapid.

For purposes of explanation, assume the multiplier to be $10^{-3}$ (decimal). Following phase I, the integer 123 (decimal) $x$ $10^{-3}$ becomes the fractional number. 0.123 (decimal). It should be understood of course that these numbers are handled in binary coded octal form in the apparatus disclosed herein but that the explanation is in terms of decimal digits for ease of explanation. During phase II the fractional number in binary coded octal, is converted to a decimal coded integer. This is done by multiplying the fraction repeatedly by decimal 10 collecting the overflow digits. This technique is common in the computer art. Thus, the following steps are followed in the example:

$$\overset{\text{octal}}{.\overline{123}} \times 10 = \overset{\text{decimal}}{\overline{1}}.\overset{\text{octal}}{\overline{23}}$$

$$\overset{\text{octal}}{.\overline{23}} \times 10 = \overset{\text{decimal}}{\overline{12}}.\overset{\text{octal}}{\overline{3}}$$

$$\overset{\text{octal}}{.\overline{3}} \times 10 = \overset{\text{decimal}}{\overline{123}}$$

Thus, the binary coded decimal integer is obtained. The apparatus then converts all the decimal digits back to octal, except for the number of least significant decimal digits specified by the scale factor. The conversion is done converting the decimal digits most significant to least significant.

The theory by which the decimal digits are converted to octal is set forth in the book entitled "Seminumerical Algorithms" by Knuth published by Addison-Wesley Publishing Company in 1969. At page 280, Vol. II, it is pointed out that a number can be converted from representation in radix b to representation in radix B by multiplying by "$b$" using radix "B" arithmetic. The book "Seminumerical Algorithms" states:

> "If $u$ has the radix $b$ representation $(u^m \ldots u^1u_0)b$, we can use radix B arithmetic to evaluate the polynomial $u_mb^m + \ldots + u_1b + u_0 = u$ in the form $((\ldots(u_mb + u_{m-1})b + \ldots)b + u_1)b + u_0$."

Table IV illustrates the sequence of operation used herein for converting the decimal digits to octal form in accordance with the mathematical formula shown above. In Table IV, $u_m$ represents the most significant decimal digit and it is taken and converted into octal coded form. The decimal digits are coded in the 1–2–4–8 binary coded decimal form. A decimal digit in the 1–2–4–8 code requires four binary bits to represent the decimal digit. Two more binary bits are added at the most significant end of $u_m$ and the bits are divided into two octal digits, each of three binary bits. For example, the binary coded decimal digit 0001 is expressed in binary coded octal form as follows: 000 001. The most significant octal digit, expressed in octal form, is then multiplied by decimal 10 which is the base $b$. The product is then added to the next to most significant decimal digit $u_{m-1}$ and the result represents the most significant and next to most significant decimal digits represented in binary coded octal form. This operation is repeated time after time, i.e. multiplying the sum times the base value decimal 10 and adding the product to the next decimal digit until the desired number of decimal digits have been converted to binary coded octal form.

It can be seen from table IV and the foregoing description that two basic operations are required for conversion between the decimal and octal codes. First, it is necessary to multiply the base $b$ times a value and the product is to be added to the next digit in the series to be converted. Thus, a multiplication is to be performed and a decimal digit is to be added for each step in the conversion, except for the first step when the octal number is taken virtually directly from the most significant decimal digit. The present invention makes use of this requirement using a two-input full parallel adder for conversion which is described in detail hereinafter.

Returning to the example, the scale factor is 1 and the decimal coded digits 123 are to be converted back to octal except for the least significant digit 3. In accordance with the method outlined above, $b$ is 10 (decimal) or 1010 (binary)

and the conversion back to octal takes place as follows (using the sequence of steps shown in table IV):

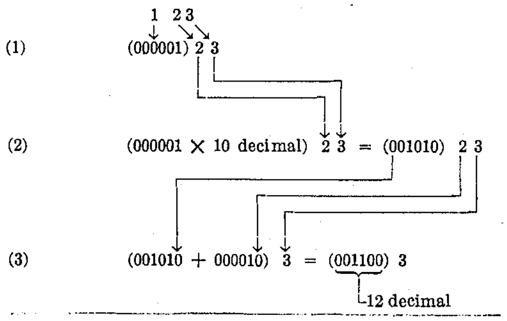

Thus, it is seen that the decimal digits 12 are converted back to binary coded octal leaving only 1 digit, namely, digit 3 in binary coded decimal form.

The apparatus of the embodiment disclosed herein handles 13 octad single precision numbers and 26 octad double precision numbers and the maximum number of decimal digits required in a scaled right number is 12. Accordingly, in the actual apparatus, $10^{-12}$ (decimal) is multiplied times the octal integer (as opposed to $10^{-3}$ used in the aforementioned example) to convert it to fractional form. 10 is selected as it is the base of the number into which the integer is to be converted by multiplying, repeatedly, by 10 (decimal). 12 is selected as the power as it is the maximum number of decimal digits desired. Table III shows $10^{-12}$ in fractional form but expressed in the octal number base. The fraction is carried out to 27 significant octal digits to maintain the required accuracy for a double precision number. For a single precision number only the upper 14 digits are used, whereas 27 digits are used for a double precision number. 13 octal digits convert accurately to 12 significant decimal digits and 26 octal digits convert accurately to 24 significant decimal digits. Hence, in accordance with the present invention, $10^{-12}$ is carried out to the same number or more octal digits than there are digits in octal coded numbers to preserve accuracy. In the embodiment disclosed herein 10 was selected in the multiplier $10^{-12}$ because successive multipliers are later used to convert the resulting octal fraction to decimal digits. Thus, the true value of the original octal integer is preserved.

To be explained in more detail herein, the significant digits shown in table III are actually generated and multiplied times the number signals being converted by a unique arrangement of a counter, a decoder and a multiplier.

Tables I and II show terminology to be used in the following description. Specifically, Tables I and II show the names of the initial integer to be converted and the names used to identify the intermediate and final numbers obtained during the scale right operation. Table I is for a single precision number, whereas table II is for a double precision number. A "single precision" number is one having one word of 39 bits (13 octades), whereas a "double precision" number is one having 2 words, each of 39 bits.

Referring to table I it will be seen that the initial single precision number to be converted is called an octal integer (having 13 octades) and the final number has two parts called a converted octal integer (having a maximum of 13 octades) and a converted decimal integer (having a maximum of 12 decades).

Referring to table II it will be seen that the initial double precision number to be converted has 2 parts called the upper octal integer (13 octades) and the lower octal integer (13 octades) which form the most significant and least significant portions of the double precision number. The final double precision number has 3 parts called the converted upper octal integer (13 octades), the converted lower octal integer (13 octades maximum) and the converted lower decimal integer (12 decades maximum). The converted decimal integer, in the case of a single precision number and the converted lower decimal integer, in the case of a double precision number, are the final decimal coded parts of the scaled right numbers, whereas the rest of the numbers form the octal coded integer parts of the scaled right numbers.

Thus, binary coded integer signals are scaled right in the sense that they are shifted right to form an upper significant binary coded octal portion and a lower significant binary coded decimal portion. The number of binary coded decimal digits in the lower significant portion is determined by the scale factor.

B. Phase I - Convert Octal Integer to Octal Fraction

1. Brief Description of Apparatus

The first step involved in the execution of a scale right operator is to convert the binary coded octal integer to a binary coded octal fraction using the high speed multiplication technique discussed above. If the octal integer is a single precision number then the whole octal integer is converted to a fraction. If the octal integer is a double precision number, it is partially converted to a fraction.

FIG. 1 is a block diagram of the processing apparatus for converting the octal integers to an octal fraction and embodies the present invention. Briefly, the organization and operation of the apparatus of FIG. 1 is as follows:

Initially, a source 13 stores a "scale right operator" signal into an operator register 11 and a "scale factor" signal into the register 72. The scale factor identifies the number of decimal digits required in the fractional part of the final scaled right number.

First, consider the conversion of a single precision binary coded octal integer to binary coded octal fraction. The source 13 stores the single precision octal integer signals into a Y register 14. The octal integer is then transferred to the A register 16.

A counter 22 is set to a predetermined state corresponding to the 14 upper octal digits shown in table III. The counter 22 then counts through 13 additional states, thereby causing the counter to assume 14 unique states before going to state 0. For purposes of illustration, the counter states are called 14, 13, 12 ... 0. However, other sequences of states could be used, i.e. the Gray code. A decoder 24 responds to each different state of the counter to generate the corresponding one of the 14 octal digits indicated in table III. 14 octal digits are used giving one more octad of accuracy than the 13 octades in the integer signal being converted in order to insure that the result is accurate to 13 octades. The first state of the counter corresponds to the least significant one of the upper 14 digits, i.e., octal digit 5, whereas state 1 of the counter 22 corresponds to the most significant octal digit 4.

Thus, the output of the decoder 24 provides a series of output signals representative of the fractional number to be used for converting the integer signals contained in the A register 16. A multiplier circuit 26 multiplies the digits formed by the decoder 24 times the integer signal contained in the A register 16 and the result (14 octades) finally appears at the output circuit 26*a*, and is subsequently stored in the X register 18. Thus, the X register now contains the octal fraction signals.

Consider the conversion of a double precision number. The source 13 stores the lower binary coded octal integer signal (see table II) into the Y register 14 and the upper binary coded octal integer signal( see table II) into the B register 12. The lower octal integer signal is then transferred to the A register 16 (the same as for a single precision number). The apparatus shown in FIG. 1 converts the lower octal integer signal contained in the A register 16 and the result is stored into the X register 18 (the same as for a single precision number). Subsequently, the upper octal integer signal is transferred from the B register 12 to the A register 16 and the counter 22 is set to state 27 which corresponds to the least significant one of the 27 octal digits indicated in table III, which is an octal digit 7. The counter 22 is then counted through 26 additional states providing a total of 27 unique states corresponding to the 27 digits shown in table I moving from right to left. The counter then goes to state 0. The last 14 counter states (before state 0) are the same as the 14 states for a single precision number. Again, the counter states are assumed to be 27, 26, 25 ... 0 but could be in some other order depending on the counter design and counting code. The decoder 24 is responsive to each different state of the counter 22 for generating the corresponding digit shown in table III. Thus, the 27 digits indicated in table III, moving from right to left, least significant to most significant, are generated one after another in sequence and are applied to the multiplier 26. The multiplier 26 is operative for multiplying the digits formed by the decoder 24 times the upper octal integer signal stored in the A register 16. The result is a 27 octal digit signal. The most significant 13 octal digits are stored in the A register 16 as the upper octal product and the least significant 14 octal digits are stored in the Y register 14 as the lower octal fraction. The adder 30 then adds the content of the Y register 14 to the content of the X register 18 (the X register 18 contains the 14 octal digits from the previous product formed using the lower octal integer). The sum is the lower octal fraction (see table II).

An important part of the apparatus shown in FIG. 1 for converting the octal integer signal to octal fraction signals is the counter 22 and decoder 24. These circuits automatically generate the series of octal digit signals which represent the fractional number used for converting the integer signals to fractional signals.

2. Detailed Description of Apparatus

Consider now the details of the apparatus of FIG. 1 for converting an octal integer to an octal fraction. The registers 12, 14, 16, 18 and the CC register 20 (contained in the multiplying means 26) each have 42 storage cells or flip-flops. Each cell is for storing a binary bit of information. FIG. 1A is a sketch illustrating the 42 storage cells in each register. The storage cells are grouped into 14 octades, each with 3 storage cells. The first octad has cells numbered 0,1 and 2, whereas the 14th octad has storage cells numbered 39, 40 and 41. The 3 bits in each octad represent a binary coded octal number.

Consider now the detailed operation of the apparatus of FIG. 1 making reference to the flow diagram of FIG. 4. Initially, the source 13 stores either a single precision integer of 13 octades into the Y register 14, or a double precision integer of 26 octades into the B register 12 and the Y register 14. Additionally, the source 13 stores a "scale right" operator in the operator register 11 and a "scale factor" signal into the S.F. register 12. This causes the control unit 10 to go from state 0 to state 1 where a control signal is formed at the S1 output.

Assume that only a single precision binary coded octal signal was provided by the source 13 and is stored in the Y register 14. The control signal at the S1 output causes a gate 33 to store the octal integer signal from the Y register 14 into the A register 16. The control signal at S1 also causes a counter-control circuit 34 to set the counter 22 into state 14, which corresponds to the least significant digit 5 of the 14 digits shown in table III. The control unit 10 goes from state 1 to state 0 where it applies a series of signals at output circuit S4 until the counter 22 returns to state 0. The counter 22 applies a control signal at output CTR≠0 when it is not in state 0. Hence, control signals are now applied at outputs S4 and CTR≠ 0. A control signal is formed at the S4·CTR≠0 output of the control unit 10 causing the decoder 24 to decode the state of the counter 22 and apply a coded output signal representing the octal digit 4 to the multiplying means 26.

The multiplying means 26 includes a multiplier circuit 28, a parallel binary adder 30, and the CC register 20. The CC register 20 is actually a conventional accumulator register which stores the sum signals formed by the adder 30. The multiplier circuit 28 can be constructed in any one of a number of different ways well known in the computer art for providing a 42-bit output signal corresponding to the product of the octal digit signals provided by the decoder 24 and the octal integer contained in the A register 16. The control signal at S4.CTR≠0 causes the multiplier circuit 28 to apply the product signals to the AA input of the adder 30. The adder is a full binary adder having a 42-bit input and a 42-bit plus carry bit output. The adder 30 combines the signals at its two inputs and applies the sum signals to the input of the CC register 20 where they are automatically stored. The control signal at the S4·CTR≠0 output also causes the decoder 24 to decode the new state of the counter 22 and apply the corresponding digit to the multiplier circuit 28.

The new control signal at S4 causes another control signal at S4·CTR≠0 which causes the decoder 24 to apply the next to the least significant digit 0 (corresponding to state 13 of counter 22) to the multiplier circuit 24. The multiplier circuit 28 multiplies the octal integer signal in the A register 16 times the new octal digit signal from the decoder 24 and again provides a signal corresponding to the product to the AA input of the adder 30. The new control signal at the S4·CTR≠0 output also causes the content of the CC register 20 to be shifted one octal digit to the right or towards the lower end of the CC register 20 (by gating not shown); causes a gate 36 to store the least significant octad shifted out of the CC register 20 into the 13th octad (cells Y37–Y39) of the Y register 14; and causes a gate 38 to gate the content of the CC register 20 back to the BB input of the adder 30. The adder 30 has an inherent delay and subsequent to the shift of the CC register 20, the adder 30 combines the signals at the AA and BB inputs and applies the sum signals back to the CC register 20 where they are automatically stored.

The operation continues for each different control signal at S4 and each different state of counter 22 (hence for each different one of the 14 digits in table III) until the counter 22 is counted down to state 0. At this time, a control signal is formed at the CTR = 0 output of the counter 22, preventing the multiplier circuit 24 from producing another product signal, preventing the CC register 20 from shifting, and preventing the gate 36 from shifting another octad into the Y register 14.

The CC register 20 now contains 14 octal digits which represent the product of the 14 digits shown in table III times the octal integer signal contained in the A register 16. Also, 14 octal digits are now contained in the Y register 14, however, these octal digits are not significant and are discarded.

After the counter 22 reaches state 0, a control signal is formed at CTR = 0 and the system takes one of two paths as indicated in the flow diagram of FIG. 4. One path is for ∅1F= 1 and the other for ∅1F=0 indicated as "YES" and "NO", respectively, in FIG. 4. Initially, the ∅1F flip-flop is in a 0 state, accordingly, the path labeled "NO" is followed. The control signal at CTR=0 causes the control unit to go to state 5 and form a control signal at S5. Thus, a control signal is formed at the S5·$\overline{\emptyset 1}$ output causing the gate 38 to gate the output of the CC register 20 back to the BB input of the adder 30, and causing a gate 40 to apply a signal to the AA input of the adder 30 representing the octal digit 2. Accordingly, the adder 30 adds the content of the CC register 20 to the octal 2 and the result is stored back into the CC register 20.

The purpose of adding the octal 2 to the result contained in the CC register 20 is to provide a correction in the number, making the number larger so that when significant digits are thrown away in subsequent operations, the resulting number is still correct to the required number of significant digits (i.e. 13 octal digits) but still slightly greater than necessary in the least significant digit. The control unit 10 then goes to state 6 causing a control signal at the S6 output.

A control signal is now formed at the S6·$\overline{\emptyset 1}$ output causing a gate 42 to store the content of the CC register 20 into the X register 18, and causing the content of the A register 16 to be cleared to 0.

As indicated in FIG. 4, two different paths are now taken, depending on the content of the B register 12. If the B register 12 is empty (which is the case for a single precision number) a control signal is formed at the B = 0 output of the B register 12. Under these conditions, phase I is now complete and the control unit 10 goes to state 10 where a control signal is formed at the S10 output.

Assume a double precision number was provided by the source 13 and hence an upper octal integer is stored in the B register 12. The processing of the lower octal integer through state 6 is identical to that described hereinabove for an octal integer of a single precision number and will not be redescribed. However, a partial lower octal fraction would now be stored in the X register 18.

Consider now the operation on a double precision number following state 6. Nonzero information is contained in the B register 12 causing a control signal at the B≠0 output. This causes the control unit 10 to take the "NO" path in FIG. 4 and go to state 7 where a control signal is formed at the S7 output.

At this point the flip-flop ∅1F is still in a 0 state causing a control signal at the ∅1 output. Thus, a control signal is formed at the S7·∅1·B≠0 output, causing a gate 44 to store the content of the B register 12 into the A register 16 (A←B); causing the set control 34 to set the counter 22 into state 27 (CTR←27) corresponding to the least significant one of the 27 digits shown in table III: and causing the ∅1F flip-flop (FIG. 2) to be set to state 1 (∅1F←1).

The control unit 10 now returns to state 4 where control signals are again sequentially formed at the S4 output. The counter 22 is not in state 0, hence, a control signal is formed at the CTR≠0 output. A control signal is again formed at the S4·CTR≠0 output causing the multiplier circuit 28 to apply an input signal to the AA input of the adder 30 corresponding to the product of the signal formed by the decoder 24 and the content of the A register 16; causing the content of the CC register 20 to be shifted one octal digit (three bits) downward (as seen in FIG. 1); causing the gate 28 to gate the shifted content of the CC register 20 back to the BB input of the adder 30; causing the gate 36 to gate the octal digit shifted out from the CC register 20 into the 13th octad of the Y register 14; causing the Y register 14 to be shifted one octad (three bits) to the left and causing the counter to count down one state. This operation is repeated for each of the remaining 26 states of the counter 22 and each of the remaining 26 digits (of the 27 digits) shown in table III until the counter 22 reaches state 0 at which time the control signal is removed from the CTR≠0 output and a control signal is again applied at the CTR = 0 output.

The CC register 20 and the Y register 14 now contain the 27 digits forming the product of the 27 digits (table III) and the upper octal integer. The CC register 20 has 14 octades and the Y register 14 has 13 octades.

The control unit 10 again goes from state 4 to state 5 applying a control signal at the S5 output. However, this time the 01F flip-flop is in a 1 state and the path to the left in FIG. 4 is taken. A control signal is applied at the ∅1 and S5 outputs, hence a control signal is formed at the S5·∅1 output causing a gate 44 to gate the upper 39 storage cells, starting with cell 41, in the CC register 20 into the 39 cells starting with cell 38 of the A register 16 (A[38:39]←CC[41:39]). In other words, the result contained in the CC register 20 is stored into the A register 16, shifted 3 storage cells or one octad to the right. Thus, we now have 13 significant octades of information stored in the A register 16 and these 13 octades form the upper octal product (see table III). The control signal at S5·01 also causes a gate 46 to store the least significant octad (storage cells CC0F, CC1F and CC2F) of the CC register 20 into the 14th octad of the Y register (Y[41:3]←CC[02:3]). The Y register 14 now contains 14 octades forming the partial lower octal fraction (table II). It is only partially the lower octal fraction because it still must be added to the partial lower octal fraction contained in the X register 18. The control unit 10 then goes to state 6.

A control signal is now formed at S6 and ∅1, hence a control signal is formed at the output circuit S6·∅1. The control signal at S6·∅1 causes a gate 48 to apply the content of the X register 18 to the AA input of the adder 30 and causes a gate 50 to apply the content of the Y register 14 to the BB input. Additionally, 1 is added to the result to provide a correction for bits which are later discarded and to insure that after the bits are discarded the least significant digit is slightly larger. To this end, the control signal at S6·∅1 causes an OR gate 51 to apply a signal to the carry input of the adder 30. The adder 30 automatically adds the inputs together and the result is stored into the CC register 20. The CC register 20 now contains the 14 octades forming the true lower octal fraction (see table II). The control unit 10 then goes to state 7.

Control signals are formed at S7 and ∅1, hence a control signal is formed at the S7·∅1 output causing the gate 42 to store the content of the CC register 20 into the X register 18.

Bit 42 of the CC register 20 is a 1 following the addition by the adder 30 whenever there is a carryout from the low order 14 octades during addition by the adder 30. If there was a carryout, then the carry must be reflected into the most significant portion of the result which is now stored in the A register 16. To this end, a check is now made to see whether bit 42 in the CC register 20 is a 1. If it is a 1, a control signal is formed at the CC[42:1]=1 output. Assume that there is no carry and that a control signal is not formed at the CC[42:1]=1 output. This will then cause the control unit 10 to go from state 7 to state 10 ending phase I and beginning phase II of the scale right operation.

Assume now that a control signal is formed at the CC[42:1] =1 output indicating that a carry occurred. Under these conditions, the control unit 10 goes from state 7 to state 8 where a control signal is formed at the S8 output. A control signal at the S8 output causes a gate 52 to gate the content of the A register 16 to the AA input of the adder 30 and causes the OR gate 51 to apply a signal to the carry input of the adder 30. As a result, the adder 30 adds 1 to the number in the A register 16 and the result is stored in the CC register 20. The control unit 10 then goes to state 9. A control signal is formed at the S9 output and causes the gate 44 to store the corrected upper octal product in the CC register 20 back into the A register 16. Following state 9 the control unit 10 goes to state 10 thus ending phase I and beginning phase II.

It should now be understood that the apparatus of FIG. 1 forms a data processing means for converting a binary coded integer signal to the fractional signal and although a binary coded example has been given for the octal system of numbers, the same principle would apply to conversion of numbers in other number bases. In the case of a single precision integer, the number of states is 14, one more than the 13 octal digits in the original octal integer. In the case of the upper octal integer of a double precision number, the number of states is 27, one more than the 26 octal digits in the original upper octal integer and lower octal integer. Thus, the number of digit signals produced by the counter and decoder is one more than the number of significant digits obtained in the final octal number whether single or double precision.

In summary, the A, B and Y registers 16, 12 and 14 receive the integer signals to be converted and the counter 22 counts through a sequence of states at least equal in number to the minimum number of significant digit signals desired in the fraction signals. The decoder 24 is responsive to each state of the counter 22 for providing coded output signals. The coded output signals thus provided represent a fractional number for converting the integer signal to a fraction signal. The digits are in the number base of the signals being converted. Speaking generally, the digits may be represented by $B^{-n}$. B is the base of the number system into which the received integer signal is to be converted; "$n$" is at least as large as the maximum number of required digits in the final decimal integer obtained following phase II. In the embodiment disclosed herein for conversion from octal to decimal, B is decimal 10 (or octal 12) whereas $n$ is decimal 12 (or octal 14). The multiplying means 26 multiplies the coded output signals times the integer signals and produces fraction signals corresponding to the product.

The method disclosed involves the method for converting binary coded integer signals to binary coded fractional signals in a number base in data processing apparatus and includes the steps of receiving integer signals to be converted from the source 13 and setting the counter 22 to a state corresponding to the number of significant digit signals in the number base desired in the fractional signals. The states of the counter 22 are responded to by the decoder 24 for producing a series of output signals representative of a fractional number desired for converting the integer signals to fractional signals. The integer signals are multiplied by the multiplier 26 times the output signals as they are produced and the counter 22 is counted through the predetermined series of states until a reference state of the counter 22 is reached. A fractional signal is thereby generated by the multiplier 16 comprising a series of digit signals representative of the product of the series of output signals and the integer signals.

It will be evident to those skilled in the art that there are a number of variations of the apparatus shown in FIG. 1 within the scope of the invention as defined in the appendant claims, For example, an entire double precision number could be converted to a fraction rather than just the least significant portion. However, a larger adder would be required and two registers would be required to hold the intermediate products. Also, the digits formed by the decoder may be modified to different values depending on the particular construction of the multiplying means. Also, the CC register 20 may be considered as part of the adder 30. The adder 30 may be gating or a combination of registers and gating which are well known in the computer art.

C. Phase II—Conversion of Octal Fraction to Decimal and Correction Cycle

1. Brief Description

Phase II is entered following phase I. As outlined above, under "Theory," the octal fraction obtained during phase I is converted to a decimal integer and then part of the digits in the decimal integer are converted back to octal. The number of decimal digits shifted to the right of the decimal point and which remain is designated by the scale factor contained in the scale factor register 72. There is a total of 12 decimal digits in the original decimal integer thus the number of decimal digits to be converted back to octal is equal to 12 (decimal) minus the scale factor.

During phase II, in the case of double precision, the upper octal product and lower octal fraction (obtained from phase I) are converted through the various steps indicated in table II. The final numbers are a converted upper octal integer plus a converted lower decimal integer. As in the case of single precision, the lower octal fraction is converted to a lower decimal integer and then a portion of the digits in the lower decimal integer are converted back to octal to form the converted lower octal integer and converted lower decimal integer. The number of decimal digits converted back to octal is again equal to 12 (decimal) minus the scale factor.

Briefly, consider the actual phase II operation of converting a single precision octal fraction to decimal. The octal fraction is converted to a decimal fraction by the process of repeatedly multiplying the octal fraction signal by decimal 10 (octal 12) using the apparatus of FIG. 1. The upper four bits of the signal resulting from each multiplication represents one of the decimal digits of the decimal fraction. The adder 30 is a full parallel binary adder. Basically, the multiplication is performed by applying the octal fraction to both inputs of the adder 30 but shifted a certain number of binary bits. For example, shifting the adder input signals one binary bit position towards the most significant end is, in effect, multiplying the number by octal 2; shifting the adder input signals two binary bits, is effectively multiplying the number by octal 4; shifting the adder input signals three binary bits is equivalent to multiplying the number by octal 10 (decimal 8). Thus, if a number is applied to one input of the adder shifted three binary bits and the same number is applied to the other input of the adder shifted two binary bits, the sum is equal to decimal 10 (octal 12) times the number. This briefly is the theory of operation whereby decimal 10 (octal 12) is repeatedly multiplied times the lower octal fraction signals. A similar operation is followed for a double precision number.

Following conversion of a single precision "octal fraction" to a decimal integer the leading decimal digit are converted back to binary coded octal by a novel method and apparatus. Briefly, conversion is effected by applying the adder 30 output signals back to both inputs thereof, shifted in binary significant with respect to the adder inputs so that effectively 10 times the adder output signals are formed by the adder. Simultaneously, one of the decimal digits to be converted is applied to the unused inputs of the adder 30 causing addition of the digits to the sum being formed. The digits are applied, one at a time, most significant to least significant. After the required number (12—scale factor) of decimal digits are converted, the sum at the output of the adder is the octal equivalent of these decimal digits and form the "converted octal integer" (see table I).

The decimal digits are applied to the unused inputs of the adder 30 by a special gating circuit 80 which will be explained in more detail hereinafter.

Similar operations are required for a double precision number.

2. Detailed Description

Consider now the details of the apparatus shown in FIG. 3 for converting the octal fraction signals to decimal integer signals. The flow diagram of FIG. 5 (FIGS. 5A, 5B and 5C) shows the sequence of operation and should be followed in the following discussion. The input circuits of the adder 30 are shown in FIG. 3. There are 42 input circuits, numbered 0–41 for each of the adder inputs AA and BB. Also, there are 42 output circuits plus a carry output circuit, all of which are inputs to the CC register 20.

The scale right operator was previously stored in the operator register 11 and the scale factor signals in the register 72. In the case of a single precision number the octal fraction signals (table I) are now contained in the X register 18. In the case of a double precision number, the upper octal product and the lower octal fraction (see table II) are stored in the A register 16 and the X register 18, respectively.

First, consider the details of the operation for converting a single precision octal fraction (in the X register 18) to decimal integer signals. As outlined above, this conversion is accomplished basically by applying the output of the adder to both of its inputs shifted in binary significance with respect to binary input circuits of the adder. However, the first multiplication by 10 is a special case. The special case comes about because of the fact that the lower octal fraction, now stored in the X register 18, has 14 octades rather than the required 13 octades. Thus, in effect, the binary coded number signals in the X register 18 are shifted 3 binary bits to the left. This means that the lower octal fraction contained in the X register 18 has already been effectively multiplied by decimal 8 (octal 10).

The special case is handled by the gating circuits 60 and 62. The gating circuit 60 gates the outputs XO→X41 from the X register 18 into input circuits 0–41 of the AA input of the adder 30. This, in effect, applies decimal 10 (octal 8) times the number in the X register 18 to the adder 30. The gating circuit 62 applies the outputs X2–X41 from the X register 18 to the input circuits 0–39 of the BB input to the adder 30. It will be noted that this, in effect, is shifting the number in the X register 18 two bit positions to the right. Since the content of the X register 18 is effectively decimal 8 times the octal fraction, the effect is to apply decimal 2 times the octal fraction contained in X register 18 to the BB input of the adder 30. The sum of 8 times the octal fraction (at the AA input) plus 2 times the octal fraction (at the BB input causes decimal 10 (octal 12) times the octal fraction to be formed by the adder 30.

In operation, the control unit 10 forms a control signal at the S10 output. This causes gates 60–0 – 60–41 of the gating circuit 60 to couple the outputs X0–X41 from the X register 18 to input circuits 0–41 of the AA input to the adder 30 (AA[41:42←X[41:42], see FIG. 5A) and causes gates 62–0 – 62–39 of the gating circuit 62 to couple outputs X2–X41 from the X register 18 to input circuits 0–39 of the BB input to the adder 30 (BB[39:40]←X[41:40]). The adder 30 automatically adds the two inputs together and the result is automatically stored into the CC register 20. Forty-three bits (0–42) are now stored in the CC register 20. The upper 4 bits (bits 39–42) are the 4 overflow bits forming the most significant decimal digit of the decimal integer. The remaining 39 bits in cells CCOF–CC38F of the CC register 20 form the 13 octades of the product from the first (special multiplication). The control signal at S10 also causes the Y register 14 to be cleared to 0 (Y←0) and causes the counter control 68 to set the counter 22 to state 11 (CTR←11). It will become evident in the following discussion that 10 is multiplied times the product contained in the CC register 20, once for each state of the counter 22, including state 0 of the counter 22. Thus, the multiplication takes place 11 additional times providing a total of 12 four-bit binary coded decimal digits.

During each state of the counter 22 outputs from cells CC0F–CC38F in the CC register 20 are applied by gating circuits 64 and 68 back to the AA and BB inputs to the adder 30. The gating circuit 64 applied the bits from the C register 20 shifted one bit position at the AA input of the adder 30. The gating circuit 66 applies the same bits shifted three-bit positions at the BB input of the adder 30. It should now be evident that this will cause the adder 30 to form an output signal which is decimal 10 (octal 12) times the product contained in the 39 bits of the CC register 20.

In operation the control unit 10 automatically goes from state 10 to state 11. In state 11 control signals are repeatedly formed at the S11 output circuit until the control unit goes out of state 11. The first control signal at S11 causes a gate 70 to store the 4 binary bits of the decimal digit in cells CC39F–CC42F of the CC register 20 into the lower 4 cells of the Y register 14 (Y[3:4]←CC[42:4]). Thus, the Y register 14 now contains the most significant digit of the decimal integer. The first control signal at the S11 output also causes the gates 64–0 - 64–39 of the gating circuit 64 to gate the outputs CC0–CC38 from the C register 20 to inputs 1–39 of the AA input to the adder 30 (AA[39:38]←CC[38:39]) and causes gates 66–0 - 66–38 to store the signals from the outputs CCO–CC38 of the CC register 20 to the input circuits 3–41 of the BB input to the adder 30 (BB[41:39]←CC[38:39]). The adder 30 automatically adds the inputs together and provides an output corresponding to a product 10 times the 39 bits contained in the CC register 20. The CC register 20 automatically stores the output of the adder 30. The CC register 20 now contains the second decimal digit in cells 39–42 and the second 39-bit product in cells 0–38. The control signal at S11 also causes the counter control 68 to count the counter 22 down one state (CTR–1) to state 10. Other actions take place during the first S11 as indicated in FIG. 5A but they are not pertinent at this time.

The control unit 10 then forms another control signal at the S11 output causing the second or next to most significant decimal digit to be gated from cells CC39F–CC42F of the CC register 20 into the least significant 4 cells of the Y register 14 by the gate 170. The control signal at S11 also causes a shift matrix 70 to shift the content of the Y register 14, 4 binary bits or 1 decimal digit to the left (Y[47:4]←Y[43:44]) so that the Y register 14 now contains the first two binary coded decimal digits side by side. The second control signal at S11 also causes the gating circuits 64 and 66 to again gate the 39-bit product contained in the CC register 20 back to the respective inputs of the adder 30 causing a product of 10 times such product to be stored back into the CC register 20.

The aforementioned operation is repeated for each occurrence of S11 until the counter 22 reaches state 0. When the counter 22 reaches 0, 12 decimal digits (or 48 bits) have been stored into the Y register 14 and form the binary coded decimal integer. When the counter 22 goes to state 0, a control signal is formed at the CTR=0 output of the counter 22. This causes the control unit 10 to go to state 13 (FIG. 5B). The last product formed by the adder 30 and stored in the CC register 20 is redundant and will be discarded during the subsequent operation.

It should be noted that although the decimal digits from the CC register 20 are shown being gated directly into the Y register 14, buffering could be provided in between the two registers to collect two or more digits before transfer to the Y register 14.

The ∅2F flip-flop is initially in state 0 and the control unit 10 is in state 13, hence the path labeled "NO" is taken from the ∅2F=1 box in FIG. 5B. The scale factor stored in the scale factor register 72, along with the operator (in register 11), identified the number of decimal digits required in the final converted decimal integer and these digits are to be stored in the B register 12. A transfer matrix 74 controls the transfer from the Y register 14 to the B register 12 and causes the decimal digits to be placed in the B register 12 at the left end of the register (B[47:4(scale factor)]←Y[4(scale factor-1):4(scale factor)]). The transfer matrix 74 has an input from a decoder 76 which decodes the scale factor contained in the scale factor register 72 and applies a control signal to the transfer matrix 74 corresponding to the amount by which the 12 decimal digits in the Y register 14 are to be shifted as they are stored in the B register 12.

Assume that the scale factor is 5. Only the low order 5 decimal digits are to be in the lower decimal fraction and the rest of the 7 digits are to be converted back to binary coded octal form. The decoder 76 is responsive to the scale factor signal of 5 contained in the register 72 for applying a signal corresponding to 28 (7 digits × 4 bits = 28bits) to the transfer matrix 74 indicating that a shift of 28 bits is required. Control signals are formed at the S13·∅2 output which causes the transfer matrix 74 to transfer the 5 digits contained in the Y register 14 into the B register 12 shifting them 28 binary bits or flip-flops so that the 5 digits now appear at the left-hand end of the B register 12.

It should be noted that the transfer of the desired decimal digits from the Y register 14 to the B register 12 could be done by shifting the digits into the Y register 14 and then transferring them directly to the B register 12. Other transfer and shifting means will be evident to those skilled in the computer art. It will also be evident to those skilled in the art that the transfer from the Y register 14 to the B register 12 can take place at other points later in the operation, depending on the overall system design.

With a scale factor not equal to 12, as has been assumed, the control unit 10 goes from state 13 to state 14. If the scale factor were 12, it would cause the control unit 10 to go from state 13 to state 0 where the operation would terminate.

Although the description up to this point has been for a single precision number the description for a double precision number would be identical except that the lower octal fraction would be used instead of the octal fraction and the result in the B register 12 at this point would be the partial lower decimal integer.

Continuing with the single precision operation during state 14, the ∅2F flip-flop is still in a 0 state; accordingly, control signals are formed at the S14 and ∅2 outputs. A control signal is then formed at the S14·∅2 output. A decoder 78 decodes the scale factor signals contained in the register 72 and applies a control signal to the counter control 68 corresponding to the difference between 11 and the scale factor (11—scale factor). Accordingly, for the assumed scale factor of five, the decoder 78 is applying signals corresponding to the value six to the counter control 68. The control signal at the S14∅2 output cause the counter control 68 to set the counter 22 into the state corresponding to the output signal from the decoder 78 i.e. six. Additionally, the control signal at S14·∅2 causes all flip-flops in the CC register 20 to be cleared to 0 and sets the ∅2F flip-flop (FIG. 2) to state 1. To be explained, the ∅2F flip-flop is a timing flip-flop which keeps track of the fact that state 11 is being entered for the second time. Following state 14, the control unit 10 automatically goes to state 11 where control signals are again formed at the S11 output.

It should be noted that the state of the counter 22 at this time determines the number of leading decimal digits to be converted back to octal code. One decimal digit is converted for each state of the counter including state 0 as it is counted towards state 0 during state 11.

In accordance with the present invention, a special mechanism is provided along with the adder 30 for simultaneously multiplying the base $b$ (decimal 10) times a number and simultaneously adding in a decimal digit to be converted. This procedure is used for converting decimal to octal as described above with reference to the book by Knuth. The method and procedure involved is an important part of the present invention and should be carefully noted.

The content of the CC register 20 is coupled back to both inputs of the adder 30 by gating circuits 64 and 66, shifted in binary significance with respect to the adder inputs to cause decimal 10 to be multiplied times the content of the CC register 20. It will be noted that several inputs to the adder 30 are left unused or uncoupled because of the nature of the shift. For example, at the BB input the gating circuit 64 only utilizes the inputs 1–39 of the AA input and the gating circuit 66 only utilizes inputs 3–41 of the BB input. Additionally, the carry input is unused. In accordance with the present invention these unused inputs are utilized to add in the decimal digit from cells Y44F–Y47F of the Y register 14. The binary bits of the decimal digit in cells Y44F–Y47F are weighted 1, 2, 4, 8, respectively, and care must be exercised to keep the same significance when gating these cells into the adder 30, so that the digit in cells Y44F–Y47F will be added to he result being formed by the adder 30. To this end, the gating circuit 80 has AND gates identified by the numbers 1, 2, 4, and 8, corresponding to the weights of cells Y44F–Y47F, respectively. AND gate 1 of 80 gates the cell Y44 to the 0 input circuit of the input BB. Similarly, cell Y45 is gated by the 2 gate of 80 into the 1 input circuit of the input BB AND gate 4 of 80 gates cell Y46 to the 2 input circuit of the input BB.

It is well known to those skilled in the computer art that in the binary-coded-decimal 8–4–2–1 code, that if the 8 bit is a 1, then the 2 and 4 bits are always 0's. Advantage is taken of this fact and, accordingly, the gating circuit 80 has two 8 gates which connect cell Y47F to the 1 and 2 input circuits of the input BB. A third 8 gate of 80 couples cell Y47F to the unused 0 input circuit of the AA input and a fourth 8 gate of 80 couples cell Y47F to the carry input of the adder 30.

Thus, the 1, 2 and 4 gates of 80 connected to the 0, 1 and 2 input circuits of input BB, provide inputs weighted 1, 2 and 4, respectively, to the adder. The four 8 gates connected to the carry input, the 0 input circuit of input AA, and the 1 and 2 input circuits of BB, all of which have weights of 1, 1, 2 and 4, respectively. Hence, when the 8 gates are activated, a decimal 8 is added into the result being formed by the adder 30. Table V shows the states of the flip-flops Y47–Y44, the corresponding gates 80 that are energized, and the corresponding values added into the result being formed by the adder 30.

Thus, it should be evident that the gating circuit 80 is a special gating circuit which is able to apply a digit of signals from the Y register 14 to the adder 30 simultaneously with the inputs from the gating circuit 64 and 66 and hence a multiplication is made by shifting, using the gates 64 and 66 while a digit from the Y register 14 is simultaneously added to the product.

With this background in mind, consider the rest of the actual operation. The Y register 14 contains the digits of the decimal integer. The counter 22 has been set to a state corresponding to 11 minus the scale factor (which for the assumed scale factor of five is six). Also, the ∅2F flip-flop is in a 1 state. The control unit 10 is now in state 11 and starts forming a sequence of control signals at the S11 output.

The first control signal at S11 causes the gating circuits 64 and 66 to couple the content of the CC register 20 back to the indicated input circuits of the adder 30. However, the CC register 20 now contains all 0's, accordingly, 0's are applied to the adder 30. The control signal at S11 also causes the gating circuit 80 to apply the most significant digit contained in the flip-flops Y47F–Y44F of the Y register 14 to the adder 30 as described hereinabove (see FIG. 5A BB2←if Y47F or Y45F, BB2← if Y47F or Y45F, BBO if Y44F, AA0 if Y47F, CARRY← if Y47F). As there are no other nonzero inputs, the most significant decimal digit in the Y register 14 is stored unaltered in the CC register 20.

The control signal at S11 also causes the shift matrix/70 to shift the content of the Y register 14 one decimal digit or four binary bits to the left (Y[47:44]←Y[43:44]) so that the next to most significant digit is now contained in cells Y44F–Y47F. The control signal at S11 also causes the counter control 68 to count the state of the counter 22 down one unit.

Thus, at the end of the first control signal at S11 the CC register 20 contains the binary coded octal equivalent of the most significant binary coded decimal digit, the Y register 14 is shifted so the next to most significant digit is contained in cells Y44F–Y47F and the counter 22 is counted down one state.

The second control signal at S11 causes the content of the CC register 20 to be again gated through the gating circuits 64 and 66 to the inputs of the adder 30, shifted in binary significance with respect to the input circuits so that decimal 10 times the content of the CC register 20 is formed by the adder 30. Simultaneously, the gating circuit 80 applies the next most significant digit, from cells Y47F–Y44F, to the unused inputs of the adder 30 causing the next to most significant decimal digit to be added to the product being formed by the adder. The CC register 20 automatically stores the sum. The second control signal at S11 also causes the Y register 14 to be shifted another decimal digit, or 4 binary bits, to the left and causes the counter control 68 to count the counter 22 down one more state.

This operation is repeated for each control signal at S11 for each digit in the Y register 14 which is to be converted until the counter 22 reaches state 0. The result contained in the CC register 20 after the counter 22 reaches state 0 is the octal equivalent of the binary coded decimal digits being converted.

The 0 state of the counter 22 causes the control unit 10 to go from state 11 to state 13. However, this time the ∅2F flip-flop is in a 1 state, accordingly, the path labeled "YES" is followed in FIG. 5B from the box ∅2F=1. It has been assumed that the number being converted is a single precision number hence the ∅1F flip-flop is in state 0 and the ∅3F flip-flop is now in a 0 state, hence the path labeled "NO" is followed from box ∅1F=1 in FIG. 5B. A control signal is now formed at the $\overline{S13}$·∅2·∅3 output causing a gate 81 to store the scaled lower octal number from the CC register 20 into the A register 16 (A[38:39]←CC[38:39]). Thus, at this time, the B register 12 contains the converted decimal integer and the A register 16 contains the converted octal integer. The control unit 10 then goes back to state 0 where a new operator is awaited.

In summary, initially the original single precision binary coded octal number is stored in the Y register 14, the scale operator is stored in the OP register 11 and the scale factor is stored in the SF register 72, all being derived from the source 13. During phase I, the binary coded octal number stored in the Y register is transferred to the A register from which it is multiplied times a fractional number using the multiplier circuit 26 thereby converting the number to a binary coded octal fraction. The binary coded octal fraction is then stored in the X register 18. During phase II, the binary coded octal number is converted to a binary coded decimal number using the adder 30 by repeated multiplications by decimal 10 and the resultant binary coded decimal digits, one by one as each is formed, is stored into the Y register 14. Subsequently, during phase II, leading decimal digits of the binary coded decimal number in the Y register 14 are converted back to a binary coded octal number which is finally stored into the A register 16 right justified. The number of the binary coded decimal digits which are converted back to octal is specified by the scale factor contained in register 72. The remaining lesser significant binary coded decimal digits in the Y register are effectively discarded or used as desired. Thus it can be seen that the original binary coded octal number has been shifted to the right by an integral number of digits wherein the number is specified by the scale factor. It is of particular interest that the digits by which the shift is made is in the decimal number base system rather than the binary coded octal number system of the original number. The resultant binary coded number to the left of the decimal point truly represents the integer portion of the shifted number and the binary coded number to the right of the decimal point truly represents the fractional part of the shifted number.

Assume, instead of a single precision number, that a double precision number is being converted. The description for conversion of the lower octal fraction would be virtually identical to that described for the octal fraction (single precision) up to the preceding entry into state 13. Thus the lower octal fraction would be converted to a lower decimal integer and stored into the Y register 14. Then the lower decimal integer would be applied to the adder by the gates 80, 64 and 66, the same as for a decimal integer, and converted in the very same manner to a lower partial octal integer and a converted lower decimal integer. The lower partial octal integer would be stored in the CC register 20 and the converted lower decimal integer would be stored in the B register 12. With a double precision number, however, the Ø1F flip-flop would be in a 1 state, hence the path labeled "YES" would be followed to state 13 from the box Ø1F=1 in FIG. 4B. The upper octal product (table II) would now be stored in the A register 16.

Assume that the control unit is in state 13. The Ø2F flip-flop is in a 1 state and the Ø3F flip-flop in a 0 state. Hence, control signals are formed at the outputs S13, Ø1, Ø2, and Ø3. Accordingly, control signals are formed at the S13·Ø1·Ø2·Ø3, S13·Ø2·Ø3, and S13·Ø1·Ø2 outputs. This causes a gating circuit 82 to gate the upper octal product in the A register 16 into the AA input of the adder 30 (unshifted) (AA-ADDER←A[38:39→) and then be stored unaltered into the CC register 20. These control signals also cause lower partial octal integer, contained in the CC register 20, to be stored into the A register 16 by the gate 80 (A[38:39]←CC[38:39]); cause the Y register to be set to 0 (Y←0); cause the X register 18 to be set to 0 (X←0); and cause the Ø3F flip-flop to be set to a one state (Ø3F←1).

The upper octal product is now multiplied times 10 a total of 12—scale factor times to correct it to take into account that only a portion of the lower half of the number was converted to decimal form. The number of times that the converted upper octal integer is multiplied by decimal 10 is counted by the counter 22. To this end, the decoder 78 is applying a signal to the countercontrol 68 corresponding to the difference between 11 and the scale factor and the control signal at S13·Ø1·Ø2·Ø3 causes the counter control 68 to set the counter 22 into a state corresponding to the output of the decoder 78. For the assumed scale factor of five, the counter 22 is again set into state six.

Following state 13, the control unit 10 then automatically goes back to state 11 where control signals are repeatedly formed at S11 as described hereinabove. This time the Y register 14 contains all 0's and the upper octal product is contained in the CC register 20. Thus, the gating circuit 80 will have no effect on the operation of the adder 30 as all 0's will be applied by the gating circuit 80. As a result, the gating circuits 64 and 66 will merely cause the adder to, in effect, multiply the content of the CC register 20 'times decimal 10 and be restored into the CC register 20, repeatedly, until the counter 22 is counted to 0, all as explained hereinabove. When the counter 22 finally reaches state 0, state 11 of the control 10 is ended and the upper octal product will have been multiplied times $10^{12-SF}$ (SF=scale factor).

However, overflow digits will be stored in cells CC39–CC42 of the CC register 20 and will be accumulated in the Y register 14 by the gate 70 similar to that described hereinabove when the lower octal fraction was converted to decimal digits.

After the counter 22 reaches state 0 the control unit 10 reenters state 13. The Y register 14 contains the upper decimal integer, the CC register 20 then contains the lower partial octal integer and the B register 12 contains the converted lower decimal integer. The lower partial octal integer contained in the CC register 20 is now to be added to the lower partial octal integer contained in the A register 16 to form the converted lower octal integer shown at line five of table II. To this end, the Ø1F flip-flop is now in a 1 state (since the number is double precision) and the Ø2F and Ø3F flip-flops are in 1 states. Accordingly, the path labeled "YES" from box Ø3F=1 is followed from FIG. 5B to FIG. 5C and the path labeled "YES" from Ø1F=1 is followed in FIG. 5C.

Control signals are formed at the S13·Ø1·Ø2 output and at the S13·Ø2·Ø3 outputs. These control signals cause the gating circuit 82 to couple the content of the A register 16 back to the AA input of the adder 30 (AA←A[38:39]) (unshifted) and cause the gating circuit 84 to couple the output of the CC register 20 back to the BB input of the adder 30 (BB←CC[38:39) (unshifted). The adder 30 adds the values together and the sum, the converted lower octal integer, is stored in the CC register 20. Following state 13, the control unit 10 goes to state 14.

A control signal is formed at the S14 output. The Ø1F, Ø2F, and Ø3F flip-flops are all in a 1 state, and control signals are formed at the Ø1, Ø2 and Ø3 outputs. Accordingly, control signals are formed at the S14·Ø1·Ø2·Ø3, the S14·Ø1·Ø2 and the S14·Ø1 outputs. These control signals cause the gate 86 to store the scaled lower octal integer from the CC register 20 into the X register 18 (X[39:40]←CC[39:40]); cause the CC register 20 to be cleared to 0 (CC←0); cause the counter control 68 to set the counter 22 to a state corresponding to 11 minus the scale factor (CTR←1−(scale factor)) and cause the Ø1F flip-flop to be set to a 0 state (Ø1F←0). Thus, the X register 18 now contains the converted lower octal integer. The counter 22 is set to the indicated state in order to convert the 11 minus scale factor over flow digits contained in the Y register 14 back to octal. Following state 14, the control unit 10 goes to state 15.

A control signal is formed at the S15 output. A decoder 88 decodes the scale factor contained in register 72 and forms an output corresponding to the number of bit positions contained in the Y register 14 which are not storing overflow digits. The control signal at S15 causes the shift matrix 70 to shift the overflow digits over the number of bit places in the Y register 14 indicated by the decoder 88(Y[47:4(11-scale factor)]←Y[4(11-scale factor)-1:4(11-scale factor)]). As a result, the overflow digits are shifted to the left end of the Y register 14.

Following state 15, the control unit 10 returns to state 11 where control signals are again repeatedly formed at the S11 output causing the counter to count down to state 0, and for each control signal at S11 the content of the CC register 20 is multiplied by 10 and a digit from the Y register 14 is added thereto by the adder 30. This is all done utilizing the gating circuits 64, 66 which shift the content of the CC register 20 as it is applied to the inputs of the adder 30 and using the gating circuit 80 which gates the digit from cells Y44F to Y47F to the unused inputs of the adder 30. Thus, again multiplication and simultaneous addition is performed as described hereinabove. After the counter 22 reaches state 0, a control signal is formed at the C.T.R. =0 output causing the control unit 10 to go back to state 13. At the end of state 13 the CC register 20 contains the converted upper octal integer (see line six of table II).

At this time the Ø1 flip-flop is in state 0; accordingly, the path labeled "NO" in FIG. 5C is followed. The Ø2F and Ø3F flip-flops are in a 1 state. Accordingly, control signals are formed at the Ø1F, Ø2F and Ø3F output circuits. An overflow of only one bit may have been obtained from the scaled lower octal integer. If such an overflow took place, the cell 39 in the X register 18 would contain a one bit. Accordingly, the overflow must be added into the upper octal integer contained in the CC register 20. To this end, a control signal is formed at the S13·Ø1·Ø2·Ø3 and the S13·Ø2·Ø3 outputs causing a gate 90 to gate the cell X39 to the carry input circuit of the adder 30 (CARRY←X39) and causing the gating circuit 84 to the gate the CC register 20 (unshifted) to the BB input (BB-ADDER←CC[38:39). As a result, the adder 30 adds the overflow, if any, stored in cell X39 to the converted upper octal integer contained in the CC register 20, and the result is now stored back into the CC register 20. Following state 13, the control unit 10 automatically goes to state 14.

In state 14 a control signal is formed at the S14·$\overline{\varnothing 1}$·∅2 ·∅3 output causing the gate 81 to store the converted upper octal integer in the CC register 20 into the A register 16.

The converted lower decimal fraction is now contained in the B register 12, the converted lower octal integer is now contained in the X register 18, and the scaled upper octal integer is contained in the A register 16. Following state 14, the control unit 10 goes to state 0 where the operation is terminated.

Thus, a means is provided for converting signals coded in a first number base to signals coded in a second number base. The adder 30 is a parallel adder having two inputs, each having 0 through *m* binary weighted input circuits. The output of the adder 30 has 0 through *n* binary weighted output circuits. The gating circuits 64 and 66 form means for coupling the 0 through *n* output circuits (via the CC register 20) to input circuits *x* through *x*+*n* of one of the inputs and to input circuits *y* through *y*+*m* of the second one of the inputs, thereby causing the product of the first or decimal number base (decimal 10) times the output of the adder 30 to be formed. A gating circuit 80 forms means for simultaneously applying the binary coded decimal digit signals (which are to be converted) one at a time from the Y register 14 to the input circuits of the adder which are not coupled to the output circuits, thereby causing the adder to form output signals corresponding to the product of the first number base (decimal 10) times the output signals from the adder plus the binary coded decimal digit signal from the Y register.

II. SCALE LEFT OPERATOR

Consider now the method and apparatus for executing a scale left operator. A scale left operator has an associated scale factor. The scale left operator specifies that an octal integer is to be scaled left scale factor number of decimal digits. This in effect is done by multiplying the octal integer by $10^{sf}$ (sf=scale factor). Thus, if the scale factor is two, the integer is to be multiplied by $10^2$.

In accordance with the present invention, the scale left operator is executed using virtually the same apparatus required for execution of the scale right operator except for the addition of a few gates.

Consider now the sequence of operation for execution of a scale left operator following the flow diagram of FIG. 6. Initially all of the registers and flip-flops in this system are reset to 0 (by gating means not shown). The source 13 (FIG. 1) stores a scale left operator into the operator register 11 and a scale factor into the scale factor register 72. This causes the control unit 10 to go from state 0 to state 16. The source 13 also stores the binary coded octal integer signals which are to be scaled, into the B register 12.

The control signals at the S16 output causes a gating circuit 90, having gates 90–0–90–38 to apply the integer contained in the B register 12 to the BB input of the adder 30 (unshifted) (BB[38:39]←B); causes the Y register 14 to be cleared to 0 (Y←0); and causes the counter control 68 to set the counter 22 to a state corresponding to the scale factor contained in register 72 (CTR←scale factor). The control unit 10 then automatically goes to state 11 where control signals are sequentially formed at the S11 output as described hereinabove. Since the Y register 14 initially contains 0's, the integer contained in the C register 20 is repeatedly multiplied by 10 until the counter 22 reaches 0. The operation utilizes the gating circuits 66 and 64 which shift the integer signals contained in CC register 20 as explained hereinabove. When the counter finally reaches state 0, the CC register 20 contains a lower octal integer and the Y register 14 contains all of the four-bit overflow digits which have been formed. The number actual of four-bit overflow digits contained in the Y register 14 is equal to the scale factor.

The ∅1F flip-flop is initially in a 0 state. Accordingly, after the counter 22 reaches state 0, the control unit follows the path labeled "NO" from the block ∅1F=1. Thus the control unit 10 goes from state 11 to state 17.

The control signal at the S17 output causes the gate 86 to store the octal result contained in the CC register 20 into the X register 18 (X[38:39]←CC[38:39]); causes the shift matrix 70 to shift the overflow digits contained in the Y register 14 to the upper end of the register (Y[47:4(scale factor)←Y[4(scale factor)−1:4(scale factor)]); causes the ∅1F flip-flop (FIG. 2) to be set to a 1 state (∅1F←1); and causes the counter control 68 to set the counter 22 back to the state corresponding to the scale factor in register 72 (CTR← scale factor). Following state 17, the control unit 10 returns to state 11.

During state 11 control signals are again repetitively formed at the S11 output until the counter 22 is counted down to state 0. However, this time the overflow digits now contained at the upper end of the Y register 14 are applied by the gate 80 to the input of the adder 30 causing them to be converted back to octal coded form in a manner identical to that described hereinabove for the scale right operator. Once counter 22 reaches state 0, all of the digits have been converted and are contained in the CC register 20. This time the path labeled "YES" is followed out of the box labeled ∅1F=1. Accordingly, control unit 10 goes from state 11 to state 18.

A control signal is formed at the S18 output of the control unit 10 causing a gate 81 to store the converted octal integer contained in the CC register 20 into the A register 16. The control unit 10 then goes to state 0.

Thus, the lower half of the scale left octal integer is contained in the X register 18, whereas the upper half is now contained in the A register 16 and the operation is complete.

It will also be evident that the scale left and scale right operators require very complicated data manipulations and the operators are executed utilizing a unique and highly efficient gating structure. It will also be seen that the counter 22 is utilized not only in forming the decimal digits for converting octal integers to octal fractions, but is used for controlling the number of digits formed during state 11 of the control unit 10. With this arrangement, the control signals at the S11 output not only cause multiplication by 10 using the shifting gates, 64 and 66, but cause the decimal digits contained in the Y register 14 to be converted back to octal form.

Although one example of the present invention has been shown by way of illustration, it should be understood that there are many other rearrangements and embodiments of the present invention within the scope of the following claims.

TABLE I

| Single Precision |
|---|
| 1) octal integer (13 octades) |
| 2) Octal fraction (14 octades) |
| 3) Decimal integer (12 decades) |
| 4) Converted octal integer (13 octades, max.) +Converted decimal integer (12 decades, max.) |

TABLE II

| | Double Precision |
|---|---|
| 1) Upper octal integer (13 octades) | Lower octal integer (13 octades) |
| 2) Upper octal product (13 octades) | Lower octal fraction (14 octades) |
| 3) Upper octal product (13 octades) | Lower decimal integer (12 decades) |
| 4) Upper octal product (13 octades) | Lower partial octal integer (13 octades, max.) + converted lower decimal integer (12 decades, max.) |
| 5) Upper decimal integer (12 decades) | Converted lower octal integer (13 octades, max.) + converted lower decimal (12 decades, max.) |
| 6) Converted upper octal integer (13 octades) | Converted lower octal integer (13 octades, max.) + converted lower decimal integer (12 decades, max.) |

TABLE III

```
                                                              direction of
                                                              counter - 22

        Counter
        States     1 - - - - - - - - - - - - 14|15 - - - - - - - - - - - 27
                   |                           |                         |
                   ↓                           |                         ↓
10-12=  .0. . .0   4 3 1 4 6 3 4 1 0 2 3 7 0 5|2 0 4 2 2 5 6 0 7 1 2 0 7  (octal)
         13        |          upper            |
        zeros      |←──── 14 digits ─────────→|
                   |
                   |←────────────── 27 digits ──────────────────────────→|
```

TABLE IV

| | | | |
|---|---|---|---|
| Simultaneously | (1) | $u_m$ | Octal No. for 1st Dec. digit |
| | (2) | $u_m b$ | |
| | (3) | $u_m b + u_{m-1}$ | Octal No. for 1st and 2nd Dec. digits |
| Simultaneously | (4) | $(u_m b + u_{m-1})b$ | |
| | (5) | $(u_m b + u_{m-1})b + u_{m-2}$ | Octal No. for 1st to 3rd Dec. Digits |

TABLE V

| States | | | | Gates of 80 energized | | | | Digit represented by Y47-Y44 and total value added into result by adder 20 |
|---|---|---|---|---|---|---|---|---|
| Y47 | Y46 | Y45 | Y44 | 8(all) | 4 | 2 | 1 | |
| 0 | 0 | 0 | 0 | | | | | 0 |
| 0 | 0 | 0 | 1 | | | | X | 1 |
| 0 | 0 | 1 | 0 | | | X | | 2 |
| 0 | 0 | 1 | 1 | | | X | X | 3 |
| 0 | 1 | 0 | 0 | | X | | | 4 |
| 0 | 1 | 0 | 1 | | X | | X | 5 |
| 0 | 1 | 1 | 0 | | X | X | | 6 |
| 0 | 1 | 1 | 1 | | X | X | X | 7 |
| 1 | 0 | 0 | 0 | X | | | | 8 |
| 1 | 0 | 0 | 1 | X | | | X | 9 |

What is claimed is:

1. Data processing means for converting a binary coded integer signal to a binary coded fraction signal in a predetermined number base the combination comprising: means for receiving such binary coded integer signal to be converted, counting means for counting through a sequence of states at least equal in number to the minimum number of significant digit signals, in such number base, desired in the fraction signal, means responsive to each state of said counting means for providing a series of binary coded digit signals, the series of binary coded digit signals thus provided representing a fractional number needed for converting the integer signal to a fraction signal, and means for combining the series of binary coded digit signals and the received integer signal for producing a product thereof representing such binary coded fraction signal.

2. Data processing means according to claim 1 wherein said combining means comprises: means for providing a binary coded output signal representative of the product of each digit signal and the integer signal, register means, adder means for combining the content of said register means with the product signals as they are formed to provide binary coded partial product signals, the register means being coupled for storing the first product signals formed and said partial product signals as they are formed; and means for controlling said counting means and register means causing the product and partial product signals stored in said register means to be shifted by one of said digit signals before combining and causing the counting means to count.

3. Data processing means according to claim 1 including register means coupled to the combining means for storing the received binary coded integer signal to be converted.

4. Data processing means according to claim 3 including further register means coupled to said combining means, said further register means storing a further binary coded integer signal forming the most significant portion of an extension of said integer signals, register means for temporarily storing the binary coded fraction signals converted from the first mentioned integer signal, means for setting the counting means and for causing the same to count through a sequence of states at least equal in number to the minimum number of significant digit signals in such number base desired in the fraction signals for both the first integer signal and the further integer signal, said means for providing a series of binary coded digit signals being operative for providing a binary coded digit signal for each of said states of said counting means, and means for combining the binary coded fraction signals from the first mentioned integer signals with the binary coded fraction signals formed from the further integer signals to form the resulting binary coded fraction signal.

5. Data processing means according to claim 1 wherein said combining means comprises means for providing a binary coded output signal representative of the product of each binary coded digit signal and the binary coded integer signal, accumulator register means, adder means for combining the signals from said combining means and the content of said accumulator register means and for storing the resultant signals in said accumulator register means, means for controlling said accumulator register means causing a digit shift therein for each said state of said counting means, gating means for said register means back to said adder means for each said state of said counting means thereby causing a true partial product to be formed by the adder means until the last of said binary coded output signals is combined and the final resulting fraction signal is formed by the adder means.

6. Data processing means according to claim 5 comprising register means for storing the digit signals shifted out of said accumulator register means from such digit shifts and thereby allow integer signals of extended length to be converted.

7. Data processing means according to claim 1 wherein the means for providing binary coded output signals comprises a decoder.

8. A method for converting a binary coded integer signal to a binary coded fractional signal in a predetermined number base in data processing apparatus including the steps of: receiving such integer signal to be converted, setting a counter to a state relative to a reference state corresponding to the number of significant digit signals in such number base desired in the fractional signal, responding to a predetermined series of states of the counter for producing a series of binary coded digit signals representative of a fractional number desired for converting the integer signal to a fractional signal, combining the integer signal and each binary coded digit signal produced thereby generating a fractional signal representative of the product of said series of binary coded digit signals and said integer signal and counting the counter through said predetermined series of states during such combining until the reference state of the counter is reached.

9. A method according to claim 8 wherein said series of states of the counter include at least as many states as there are significant digits desired in the fractional signal.

10. A method according to claim 8 wherein said step of combining includes the steps of multiplying each of said binary coded digit signals times the binary integer signal and for producing a product signal for each said binary coded digit signals forming a sum signal following each said product signals, shifting each said product signal and sum signal relative to each other one of such digit signals, the step of forming said sum signal including the step of combining said shifted signals to form output signals corresponding to the sum thereof.

11. A method according to claim 9 wherein the binary coded integer signal may include a further binary coded integer signal forming the most significant portion of such integer signal, including the steps of repeating the preceding steps using the further integer signals as the integer signal to be converted, the step of setting the counter including the step of setting the counter to a state corresponding to the total number of significant digit signals in such number base desired in the fractional signals for both the integer and further integer signals, and the series of states of such counter including at least as many states as there are significant digits desired in the fractional signals for both such integer and further integer signals, thereby causing a second but intermediate binary coded fractional signal to be formed and including the further step of combining the binary coded fractional signal obtained from the conversion of said integer signal with the second binary coded fractional signal obtained from conversion of said further integer signal to produce the final binary coded fractional signal.

12. A method for converting binary coded octal integer signals to binary coded octal fractional signals in data processing apparatus including the steps of: receiving such octal integer signals to be converted, setting a counter to a state corresponding to the number of significant octal digit signals desired in the fractional signals, responding to a predetermined series of states of the counter for producing a series of output signals representative of a binary coded fractional number desired for converting the octal integer signals to such octal fractional signals, multiplying the octal integer signals times the octal output signals as they are produced and counting the counter through said predetermined series of states during such multiplication until a reference state of the counter is reached and including the step of generating a series of binary coded octal fractional digit signals representative of the product of said series of octal output signals and said octal integer signals.

13. Arithmetic apparatus for converting binary signals coded in a first number base to binary signals coded in a second number base, the combination comprising a full binary adder having a carry input circuit to the least significant position and two further inputs and an output, each of the adder means further inputs and the output comprising a plurality of circuits each circuit having a different binary weighted significance, first gating means coupling signals from said circuits of said adder means output to said circuits of both said adder means further inputs, the circuits of at least one input being of different binary weight than the circuits of said output from which the signals are coupled leaving a plurality of said circuits of at least one of said further inputs uncoupled, means for providing a plurality of binary coded digit signals for conversion, each digit signal comprised of binary bits, and second gating means for serially coupling the binary bits of said digit signals to said uncoupled circuits and to said carry input circuit.

14. Arithmetic apparatus according to claim 13 comprising means for activating said first and second gating means causing signals from said providing means and signals from circuits in said adding means output to be coupled to the circuits in said adder means input substantially simultaneously.

15. Arithmetic apparatus according to claim 13 wherein said means for providing binary coded digit signals comprises storage means.

16. Arithmetic apparatus according to claim 15 comprising third gating means for coupling signals from preselected circuits in said adder means output to said storage means.

17. Arithmetic apparatus according to claim 16 comprising register means coupled in between said output of said adder means and said first gating means for storing signals to be converted, means for activating said first gating means a plurality of times thereby causing the content of said register means to be applied to said adder means input a plurality of times and each time the resultant signals formed by said adder means being stored in said register means, said means for activating being operative for activating said third gating means a plurality of times causing signals from said preselected circuits in said adder output to be stored in said storage means.

18. Data processing apparatus for converting a series of binary coded decimal digit signals to binary signals coded in octal, each decimal digit having four binary bits respectively weighted 1–2–4–8, the apparatus comprising, a full parallel binary adder having two inputs, a least significant position carry input and an output, each said input comprising 0, least significant, through $m$, most significant, binary weighted input circuits and the output comprising 0, least significant, through $n$, most significant, binary weighted output circuits, means for coupling said 0 through $n$ output circuits to input circuits 3 through $3+n$ of a first one of said inputs and to input circuits 1 through $1+n$ of the second one of said inputs, and means for applying said binary coded decimal digit signals, a digit at a time, to said adder comprising means for applying binary bit 8 to said carry input and to input circuits 0, 1 and 2 of said first input and to input circuit 0 of said second input and means for applying bits 1, 2 and 4 to input circuits 0, 1 and 2 of said second input thereby causing the adder to form output signals corresponding to the product of ten times the output signals from said adding means plus the digit signal being applied.

19. A method of converting a series of binary coded decimal digit signals to binary coded octal signals in data processing apparatus having a counter and at least a two-input parallel adder performing binary addition in octal code, comprising the steps of: setting a counter to a state, relative to a reference state, corresponding to the number of digit signals to be converted; applying the most significant one of such binary coded digit signals to an input of such adder to form adder output signals; counting the counter at least one state towards the reference state and applying the adder output signals back to both inputs of such adder, shifted in binary significance with respect to at least one such input, such that the effective sum formed by the adder is the product of ten times the adder output signals and simultaneously applying the next to most significant decimal digit signal to an input of such adder causing addition thereof into the effective sum being formed and causing corresponding adder output signals; and repeating the preceding step for each different counter state using the adder output signals formed during the last occurrence of the preceding step and using different digit signals for each repetition until the counter reaches such reference state, the digit signals being used in the order of significance from most to least significant digit signals thereby producing final adder output signals representing to the desired binary coded octal signals.

20. A method for converting a binary coded binary coded octal integer signal into a most significant portion coded in octal and a least significant portion composed of binary coded decimal digits, the number of decimal digits being indicated by a scale factor signal, comprising the steps of: counting a counter through a predetermined series of states, responding each of said states for producing a series of octal coded digit signals representative of octal $12^{-n}$ where $n$ is at least as large as the maximum number of decimal digits desired in the result, combining the integer signal and each coded digit signal produced and generating a fractional signal representative of the product of said series of coded digit signals and said integer signals; applying the fractional signal, and a series of product signals desired therefrom, to a multiplying means multiplying each by ten to produce product signals, the fraction signal and a total of at least $n-1$ product signals derived therefrom being applied to such multiplying means; storing the most significant signals, which represent a decimal digit, from each of said product signals, in the order formed, most significant to least significant; serially applying the stored decimal digit signals, most significant to least significant, to an input of a two-input parallel adder which performs binary addition in octal coded form, the number of decimal digit signals applied being at least $n$ minus the value of the scale factor signal; applying the adder output signals back to both inputs of such adder, shifted in binary significance with respect to at least one such input, such that the effective sum formed by the adder is the product of ten times the applied adder output signals plus the applied digit signal causing corresponding adder output signals, one such digit signal being applied at a time simultaneously with the applying of each different one of said adder output signals, said adder output signals after all such digit signals are applied representing the most significant octal portion of the converted signal and the remaining stored decimal digit signals representing the least significant portion of the converted signal.

21. Apparatus for converting a binary coded octal integer signal into a most significant portion coded in binary coded octal and a least significant portion composed of binary coded decimal digits, the number of decimal digits being indicated by a scale factor signal, comprising means for counting a counter through a predetermined series of states; means for responding to each of said states for producing a series of octal coded digit signals representative of octal $12^{-n}$ where $n$ is at least as large as the maximum number of decimal digits desired in the result, means for combining the integer signal and each coded digit signal produced and for generating a fractional signal representative of the product of said series of coded digit signals and said integer signals, means for applying the fractional signal, and a series of product signals derived therefrom, to a multiplying means multiplying each by ten to produce product signals, the fraction signal and a total of at least $n-1$ product signals derived therefrom being applied to such multiplying means; means for storing the most significant signals, which represent a decimal digit, from each of said product signals, in the order formed, most significant to least significant; a two-input parallel adder which performs binary addition in octal coded form; means for serially applying the stored decimal digit signals, most significant to least significant, to an input of said adder, the number of decimal digit signals applied by said serial applying means being at least $n$ minus the value of the scale factor signal; means for applying the adder output signals back to both inputs of such adder, shifted in binary significance with respect to at least one such input, such that the effective sum formed by the adder is the product of ten times the applied adder output signals plus the applied digit signal causing corresponding adder output signals, said means for applying adder output signals being operative for applying one such digit signal at a time simultaneously with the applying of each different one of said adder output signals, said adder output signals after all such digit signals are applied representing the most significant octal portion of the converted signal and the remaining stored decimal digit signals representing the least significant portion of the converted signal.

22. Data processing apparatus for shifting left a binary coded signal coded in a first number base by digits coded in a second base comprising: first register means for storing an operator identifying a left shift; second register means for storing a scale factor signal identifying the number of required left digit shifts; counter means; means responsive to said stored shift operator for counting said counter means through a sequence of states corresponding to said scale factor; at least a two-input parallel adder means operating in said first number base; means operative for each of said states of said counter means for applying the adder means output signal back to both inputs of said adder means, shifted in binary significance with respect to at least one such input, such that the resulting output signal formed by the adder means is the product of the second number base times the applied adder means output signals; and includes a binary coded decimal overflow digit signal; means responsive to said stored shift operator for selectively and initially applying a binary coded signal which is to be shifted, to said adder means causing an initial adder means output signal; third register means; means for storing each of said overflow digit signals into said third register means; said counting means being operative for causing said counter to recount through a subsequent sequence of states corresponding to said scale factor; means responsive to said stored shift operator for selectively applying said digit signals stored in said third register means, a digit at a time with each said subsequent states of said counting means, to an input of said adder means substantially simultaneously with said application of one of said adder means output signals thereby causing addition thereof into the sum being formed.

23. Data processing apparatus according to claim 22 wherein said first number base is octal.

24. Data processing apparatus according to claim 23 wherein said second number base is decimal.

25. Data processing apparatus according to claim 23 comprising control means for first activating said means for applying a binary coded signal to be converted and subsequently activating said means for selectively applying digit signals stored in said third register means.

26. Data processing apparatus for shifting a binary coded signal by digits coded in a predetermined number base comprising: first register means for storing an operator identifying a shift; second register means for storing a scale factor signal identifying the number of required digit shifts; counter means; means for selectively counting said counter means through a sequence of states including a sequence of states predetermined by said stored scale factor; two input parallel adder means; means operative for each of said states of said counter means for applying the adder means output signal back to both inputs of said adder means, shifted in binary significance with respect to at least one such input, such that the resulting output signal formed by the adder means is the product of the predetermined number base times the applied adder means output signals and includes a binary coded overflow digit signal; means responsive to said stored shift operator for selectively applying a binary coded signal which is to be shifted, to said adder means causing an adder means output signal including a binary coded overflow digit signal; third register means; means for storing in said third register means each of said overflow digit signals; and means responsive to said stored shift operator for selectively applying digit signals stored in said third register means, a digit at a time with each said states of said counting means to an input of said adder means substantially simultaneously with the application of one of said adder means output signals thereby causing addition thereof into the sum being formed, said last mentioned applying means being operative for applying during the states of said counter which is predetermined by said scale factor.

27. Data processing apparatus according to claim 26 wherein said shift operator comprises a shift right operator wherein said counter states are equal to or less than the total number of digits in said third register means and thereby cause a signal to be formed which is partially in said predetermined number base and partially in the number base of said binary coded signal to be shifted.

28. Data processing apparatus for shifting a binary signal coded in a first number base by digits coded in a second number base comprising: register means for storing an operator identifying a shift; second register means for storing a scale factor signal identifying the number of required digit shifts; means for receiving a binary signal coded in said first number base; and means responsive to said stored shift operator signal and said stored scale factor signal for shifting said received binary signal, in said first number base, by the number of digits in said second number base which is identified by said stored scale factor.

29. Data processing apparatus according to claim 28 wherein said shift means is operative for effecting a right shift and comprises means responsive to said shift operator and said stored scale factor for converting the binary signal in said first number base to a signal having a fractional part comprising digits coded in said second number base, the number of such digits being identified by said scale factor, and an integer portion coded in said first number base.

30. Data processing apparatus according to claim 28 wherein said shift means is operative for effectively shifting left and comprises means for shifting left said received binary signal coded in said first number base by multiplying same times said second number base.

31. Data processing apparatus according to claim 28 wherein said operators may specify a shift left or a shift right and wherein said shift means comprises means responsive to a stored shift right operator for shifting said received binary signal to the right, in said first number base, by the number of digits of said second number base specified by said scale factor and means responsive to a stored shift left operator for shifting said received binary signal to the left, in said first number base, by the number of digits of said second number base specified by said stored scale factor.

32. Data processing apparatus according to claim 9 wherein said means responsive to a shift left operator comprises means for converting said received binary signal to a fractional signal, means for converting said fractional signals to binary signals coded in said second number base which fractional signal comprises "Y" binary digits, and means for converting "Y" minus said scale factor of the digits in said fractional signal back to a binary signal coded in said first number base.

33. Data processing apparatus for shifting a binary signal coded in a first number base by digits coded in a second number base comprising: register means for storing an operator identifying a shift; register means for storing a scale factor signal identifying the number of required digit shifts; means for receiving a binary signal coded in said first number base; means responsive to said stored scale factor operator for shifting said received binary signals in said first number base by digits in said second number base and comprising means at least partially converting said received binary signals to at least one intermediate binary digit signal coded in said second number base; means for converting the number of the digits in said intermediate signal back to said first number base wherein the number of digits is specified by a control signal; and means responsive to said stored scale factor for applying said control signal to said conversion means identifying the number of digits to be converted.

34. Data processing apparatus according to claim 51 wherein said intermediate signal comprises "Y" digits, wherein said shift operator identifies a right shift and the control signal applying means applies a signal corresponding to "Y" minus the scale factor of digits to be converted, said conversion means being operative for converting the number of most significant digits specified by said control signal.

35. Data processing apparatus according to claim 33 wherein said shift operator identifies a left shift and the control signal applying means applies a control signal corresponding to the scale factor, said conversion means being operative for converting the number of most significant digits specified by said control signals.

* * * * *

PO-1050
(5/69)

UNITED STATES PATENT OFFICE
CERTIFICATE OF CORRECTION

Patent No. 3,626,167 Dated Dec. 7, 1971

Inventor(s) LeRoy R. Guck, Lawrence G. Hanson and Donald E. Knuth

It is certified that error appears in the above-identified patent and that said Letters Patent are hereby corrected as shown below:

Col. 5, lines 24 and 25, "01F" should read --Q1F--;
line 49, delete "octal" at the beginning of the sentence and insert it after --coded--;
line 72, delete the phrase "multiplication is used rather than division because".

Col. 6, line 35, "(u $^{m}$. . . u$^{1}$u$_{o}$)b" should read --($u_m$ ... $u_1u_0$)b--

Col. 7, in the table at (2), there should be a downward arrow over the third zero in --(0000001 x 10 decimal)--;

Col. 9, line 61, "S4 CTR ≠ 0" should read --S4.CTR ≠ 0--

Col. 10, line 4, "S4 CTR ≠ 0" should read --S4.CTR ≠ 0--

Col. 11, line 49, "01F" should read --Q1F--;
line 60, "S5-01" should read --S5-Q1--;

Col. 12, line 40, delete "the" and insert --a binary coded--;
lines 40 and 41, delete "a binary coded" and insert --the- Col. 14, line 1, "digit" should read --digits--;
line 65, insert --)-- after "input";
line 72, insert --]-- after "42", first occurrence;

Col. 15, line 20, "applied" should read --applies--;
line 55, "170" should read --70--;
line 56, "70" should read --170--;

Col. 16, line 7, "identified" should read --identifies--;

Col. 17, line 23, "he" should read --the--;
line 29, "AND" should read --and--;
line 75, "70" should read --170--;

cont'd . . .

PO-1050 (5/69)

UNITED STATES PATENT OFFICE

CERTIFICATE OF CORRECTION

Patent No. 3,626,167 Dated Dec. 7,1971

Inventor(s) LeRoy R. Guck, Lawrence G. Hanson and Donald E. Knuth

It is certified that error appears in the above-identified patent and that said Letters Patent are hereby corrected as shown below:

(cont'd from page 1)

Col. 18, line 40, "Ø3" should read --$\overline{Ø}$3--;

Col. 19, line 43, "countercontrol" should read --counter control--

Col. 20, line 68, "Ø1" should read --$\overline{Ø}$1--;
line 69, "$\overline{Ø}$3" should read --Ø3--;

Col. 21, line 53, "signals" should read --signal--;
line 69, "The number actual" should read --The actual number--;

Col. 22, in table II, col. 2, insert --integer-- beneath the words "(13 octades, max.)
+ converted lower decimal"

Col. 22, in table III, left hand column, "10-12" should read --$10^{-12}$--;

Col. 27, line 15, delete "to";
line 17, delete "binary coded", second occurrence;
line 19, before "octal" insert --binary coded--;
line 31, "desired" should read --derived--;

Col. 28, line 35, delete the semi-colon (;) between "signals" and "and";

Col. 29, line 25, delete "second";

Col. 30, line 9, "9" should read --31--; line 34, "51" should read -- 33 --.

Signed and sealed this 10th day of April 1973.

(SEAL)
Attest:

EDWARD M.FLETCHER,JR.
Attesting Officer

ROBERT GOTTSCHALK
Commissioner of Patents